US012802369B2

(12) United States Patent
Reddy et al.

(10) Patent No.: US 12,802,369 B2
(45) Date of Patent: Nov. 17, 2026

(54) MULTI-USER EXTENDED-REALITY

(71) Applicant: QUALCOMM Incorporated, San Diego, CA (US)

(72) Inventors: Varun Amar Reddy, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 18/829,000

(22) Filed: Sep. 9, 2024

(65) Prior Publication Data

US 2026/0073641 A1 Mar. 12, 2026

(51) Int. Cl.

| | |
|---|---|
| ***G06T 19/00*** | (2011.01) |
| ***G06F 3/01*** | (2006.01) |
| ***G06F 3/0346*** | (2013.01) |
| ***G06T 15/20*** | (2011.01) |

(52) U.S. Cl.

CPC ............ *G06T 19/006* (2013.01); *G06F 3/012* (2013.01); *G06F 3/0346* (2013.01); *G06T 15/20* (2013.01); *G06T 2200/16* (2013.01); *G06T 2219/024* (2013.01)

(58) Field of Classification Search

CPC ... G06T 19/006; G06T 15/20; G06T 2200/16; G06T 2219/024; G06F 3/012; G06F 3/0346

See application file for complete search history.

(56) References Cited

U.S. PATENT DOCUMENTS

| | | | | |
|---|---|---|---|---|
| 11,232,639 | B2 * | 1/2022 | Short | G06T 19/006 |
| 2017/0169610 | A1 * | 6/2017 | King | G06F 3/012 |
| 2017/0358140 | A1 * | 12/2017 | Kohler | G02B 27/0172 |
| 2019/0130599 | A1 * | 5/2019 | Gebbie | G06V 40/23 |
| 2019/0130648 | A1 | 5/2019 | Duca et al. | |
| 2021/0019948 | A1 * | 1/2021 | Short | G06F 3/011 |
| 2023/0078612 | A1 * | 3/2023 | Tartz | G06F 3/011 |
| 2025/0144812 | A1 * | 5/2025 | Hartmann | G06F 3/011 |

FOREIGN PATENT DOCUMENTS

| | | |
|---|---|---|
| EP | 4227749 A1 | 8/2023 |

OTHER PUBLICATIONS

International Search Report and Written Opinion PCT/US2025/036697 ISA/EPO Oct. 17, 2025.

* cited by examiner

*Primary Examiner* — Terrell M Robinson
(74) *Attorney, Agent, or Firm* — Polsinelli LLP/QUALCOMM Incorporated

(57) ABSTRACT

Systems and techniques are described herein for extended reality. For instance, a method for extended reality is provided. The method may include obtaining, at a first XR device, a location for a user of a second XR device in an environment of the first XR device; rendering, at the first XR device, a representation of an avatar associated with the second XR device based on the location; and modifying the representation of the avatar based on messages exchanged between the first XR device and the second XR device.

30 Claims, 12 Drawing Sheets

MULTI-USER EXTENDED-REALITY

TECHNICAL FIELD

The present disclosure generally relates to extended reality (XR). For example, aspects of the present disclosure include systems and techniques for a multi-user XR applications.

BACKGROUND

Extended reality (XR) technologies can be used to present virtual content to users, and/or can combine real environments from the physical world and virtual environments to provide users with XR experiences. The term XR can encompass virtual reality (VR), augmented reality (AR), mixed reality (MR), and the like. XR systems can allow users to experience XR environments by overlaying virtual content onto a user's view of a real-world environment.

For example, an XR head-mounted device (HMD) may include a display that allows a user to view the user's real-world environment through a display of the HMD (e.g., a transparent display). The XR HMD may display virtual content at the display in the user's field of view overlaying the user's view of their real-world environment. Such an implementation may be referred to as "see-through" XR. As another example, an XR HMD may include a scene-facing camera that may capture images of the user's real-world environment. The XR HMD may modify or augment the images (e.g., adding virtual content) and display the modified images to the user. Such an implementation may be referred to as "pass through" XR or as "video see through (VST)." The user can generally change their view of the environment interactively, for example by tilting or moving the XR HMD.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for extended reality. According to at least one example, a method is provided for extended reality. The method includes: obtaining, at a first XR device, a location for a user of a second XR device in an environment of the first XR device; rendering, at the first XR device, a representation of an avatar associated with the second XR device based on the location; and modifying the representation of the avatar based on messages exchanged between the first XR device and the second XR device.

In another example, an apparatus for extended reality is provided that includes at least one memory and at least one processor (e.g., configured in circuitry) coupled to the at least one memory. The at least one processor configured to: obtain a location for a user of a second XR device in an environment of the first XR device; render a representation of an avatar associated with the second XR device based on the location; and modify the representation of the avatar based on messages exchanged between the first XR device and the second XR device.

In another example, a non-transitory computer-readable medium is provided that has stored thereon instructions that, when executed by one or more processors, cause the one or more processors to: obtain a location for a user of a second XR device in an environment of the first XR device; render a representation of an avatar associated with the second XR device based on the location; and modify the representation of the avatar based on messages exchanged between the first XR device and the second XR device.

In another example, an apparatus for extended reality is provided. The apparatus includes: means for obtaining, at a first XR device, a location for a user of a second XR device in an environment of the first XR device; means for rendering, at the first XR device, a representation of an avatar associated with the second XR device based on the location; and means for modifying the representation of the avatar based on messages exchanged between the first XR device and the second XR device.

In another example, a method is provided for extended reality. The method includes: obtaining, at a second XR device, a location in an environment of a first XR device for a user of the second XR device; obtaining, at the second XR device, environmental data based on sensor data obtained at the first XR device; and rendering a representation of the environment of the first XR device based on the environmental data and the location for the user of the second XR device.

In another example, an apparatus for extended reality is provided that includes at least one memory and at least one processor (e.g., configured in circuitry) coupled to the at least one memory. The at least one processor configured to: obtain a location in an environment of a first XR device for a user of the second XR device; obtain environmental data based on sensor data obtained at the first XR device; and render a representation of the environment of the first XR device based on the environmental data and the location for the user of the second XR device.

In another example, a non-transitory computer-readable medium is provided that has stored thereon instructions that, when executed by one or more processors, cause the one or more processors to: obtain a location in an environment of a first XR device for a user of the second XR device; obtain environmental data based on sensor data obtained at the first XR device; and render a representation of the environment of the first XR device based on the environmental data and the location for the user of the second XR device.

In another example, an apparatus for extended reality is provided. The apparatus includes: means for obtaining, at a second XR device, a location in an environment of a first XR device for a user of the second XR device; means for obtaining, at the second XR device, environmental data based on sensor data obtained at the first XR device; and means for rendering a representation of the environment of the first XR device based on the environmental data and the location for the user of the second XR device.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
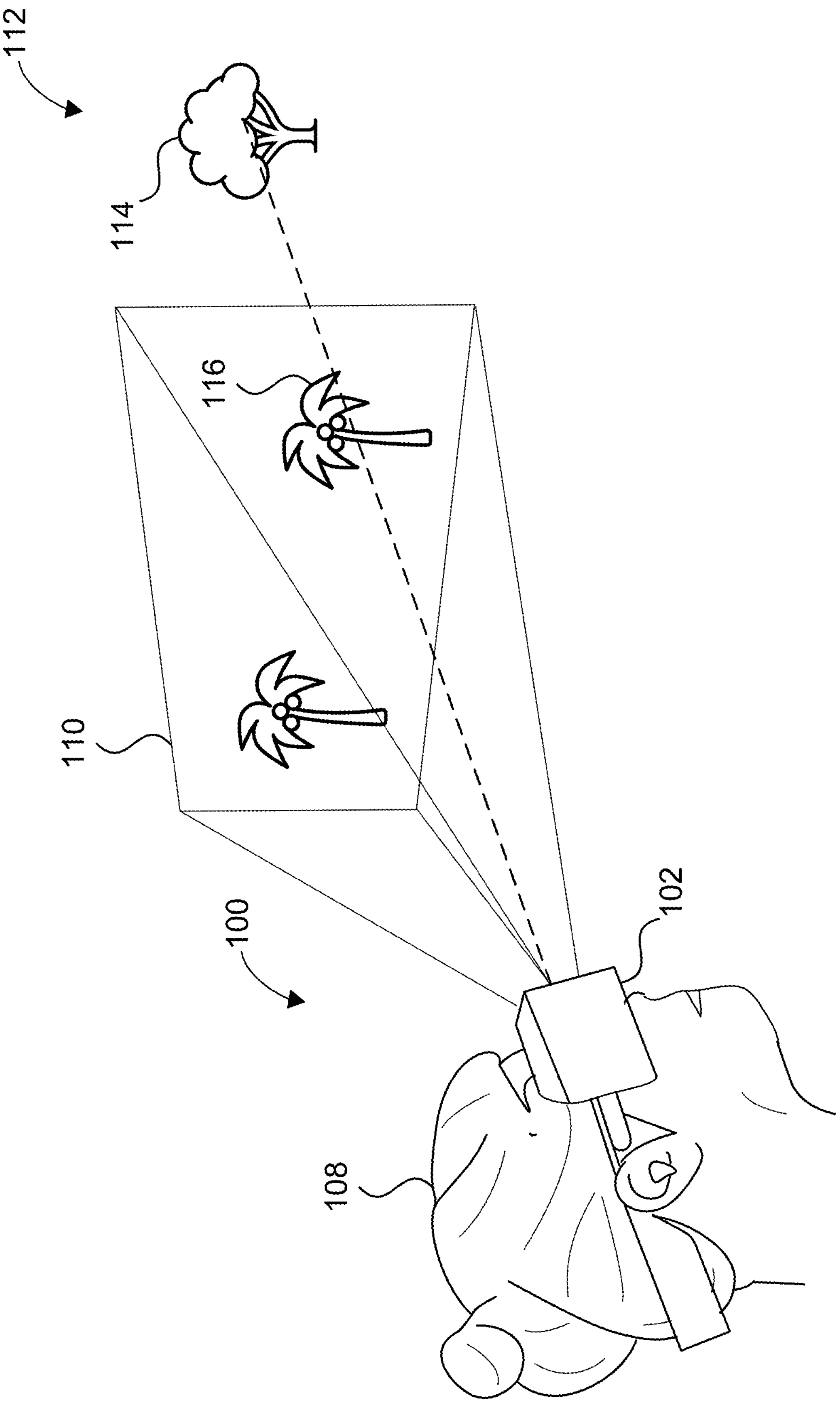
FIG. 1 is a diagram illustrating an example extended-reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As noted previously, an extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include head-mounted displays (HMDs) (which may also be referred to as a head-mounted devices), XR glasses (e.g., AR glasses, MR glasses, etc.) (also referred to as smart or network-connected glasses), among others. In some cases, XR glasses are an example of an HMD. In some cases, an XR system can track parts of the user (e.g., a hand and/or fingertips of a user) to allow the user to interact with items of virtual content.

XR systems can include virtual reality (VR) systems facilitating interactions with VR environments, augmented reality (AR) systems facilitating interactions with AR environments, mixed reality (MR) systems facilitating interactions with MR environments, and/or other XR systems.

For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects, devices, and/or points in the physical world. For example, an XR system can use tracking information to calculate the relative pose of devices, objects, and/or points of the real-world environment in order to match the relative position and movement of the devices, objects, and/or points of the real-world environment. In some examples, the XR system can use the pose and movement of one or more devices, objects, and/or points of the real-world environment to render content relative to the real-world environment in a convincing manner. The relative pose information can be used to match virtual content with the user's perceived motion and the spatio-temporal state of the devices, objects, and/or points of the real-world environment. Matching virtual content to devices, objects, and points of the real-world environment may be referred to as "anchoring." For example, a virtual object may be anchored to a device, object, or point of the real-world environment. In some cases, an XR system can track parts of the user (e.g., a hand and/or fingertips of a user) to allow the user to interact with items of virtual content.

XR systems or devices can facilitate interaction with different types of XR environments (e.g., a user can use an XR system or device to interact with an XR environment). One example of an XR environment is a metaverse virtual environment. A user may virtually interact with other users (e.g., in a social setting, in a virtual meeting, etc.), virtually shop for items (e.g., goods, services, property, etc.), to play computer games, and/or to experience other services in a metaverse virtual environment. In one illustrative example, an XR system may provide a 3D collaborative virtual environment for a group of users. The users may interact with one another via virtual representations of the users in the virtual environment. The users may visually, audibly, haptically, or otherwise experience the virtual environment while interacting with virtual representations of the other users.

A virtual representation of a user may be used to represent the user in a virtual environment. A virtual representation of a user is also referred to herein as an avatar. An avatar representing a user may mimic an appearance, movement, mannerisms, and/or other features of the user. In some examples, the user may desire that the avatar representing the person in the virtual environment appear as a digital twin of the user. In any virtual environment, it is important for an XR system to efficiently generate high-quality avatars (e.g., realistically representing the appearance, movement, etc. of the person) in a low-latency manner. It can also be important for the XR system to render audio in an effective manner to enhance the XR experience.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

XR technologies can be applied to a variety of use cases, including cooperative gaming and events such as concerts. In one use case, a VR user may not be co-located with an AR user (or multiple AR users), but the VR user may still want to interact with the AR user(s) and their environment through a virtual view.

Systems, apparatuses, methods (also referred to as processes), and computer-readable media (collectively referred to herein as "systems and techniques") are described herein for extended reality. For example, the systems and techniques described herein may allow a first XR user (or multiple first XR users) in a first environment to interact with a second XR user (or multiple second XR users) in a second environment. For instance, a first XR user in a first environment may be presented with a virtual avatar representative of a second XR user. The second XR user may be presented with a virtual view of the first environment, including an avatar representing the first XR user. The systems and techniques may identify a feasible region for the second XR user in the first XR user's environment. Additionally, the systems and techniques may use criteria for how the content (e.g., representative of the environment) and the user projections (e.g., avatars) may be adapted based on position measurements and the XR devices'capabilities.

For example, AR content may be displayed to a user 1 (e.g., an AR-device user). User 1 may be able to see the AR content and the environment of user 1. VR content may be displayed to a user 2 (e.g., a VR-device user). The VR device of user 2 may occlude the view of user 2 of the environment of user 2. User 2 may not be in the vicinity of user 1. User 2 may interact with user 1 by projecting himself/herself as an object in the AR content seen by user 1. The object may be an animated version of an object (such as a red tree or an avatar selected by user 2). Additionally, user 1 may be projected as an object in the VR content seen by user 2. The nature (size, orientation, color, object type, etc.) of the object/avatar which represents user 2 in the AR content of user 1 (and/or the nature of the object/avatar that represents user 1 in the VR content of user 2) may be determined by the relative position and orientation between the projections of user 1 and user 2 and the capabilities of both the user devices.

For example, the AR device of user 1 and/or the VR device of user 2 may determine a location for the VR device of user 2 in the environment of user 1. In some cases, the AR device of user 1 may determine the location for the VR device of user 2. In other cases, the AR device of user 1 may determine a region of the environment of user 1 and provide an indication of the region to the VR device of user 2. The region may be a region of the environment that would be a suitable location for an avatar of user 2 to be anchored. The VR device of user 2 may determine the location for the VR device of user 2 based on the region and provide an indication of the location to the AR device of user 1.

The AR device of user 1 may render a representation of user 2 in the location of the environment (e.g., anchored, at least initially, to the location). In rendering the representation of user 2, the AR device of user 1 may render the representation based on the location, for example, based on the position of the location relative to the AR device of user 1. For instance, the AR device of user 1 may render the avatar of user 2 having a size based on the distance between the AR device of user 1 and the location. Additionally, the AR device of user 1 may render the avatar of user 2 from a viewing angle based on the position of the location relative to the AR device of user 1.

The VR device of user 2 may render a representation of the environment of user 1. For example, the AR device of user 1 may provide the VR device of user 2 with environmental data representing aspects of the environment of user 1. For instance, the AR device of user 1 may include sensors (e.g., cameras) that may capture data (e.g., image data) representative of the environment. The AR device of user 1 may determine environmental data (e.g., a 3D model of the environment) based on the sensor data and provide the environmental data to the VR device of user 2. The VR device of user 2 may render a representation of the environment, based on the environmental data, and display the representation for user 2. In this way, user 2 may experience a virtual representation of the environment of user 1.

As another example, the AR device of user 1 may determine coordinates of the environment of user 1 (e.g., latitude and longitude) and provide the coordinates to the VR device of user 2. The VR device of user 2 may obtain environmental data (e.g., video, images, and/or 3D models of the environment) corresponding to the coordinates of the environment. For example, a server may store and provide environmental data including images and/or 3D models of the environment. As another example, there may be a camera capturing images in the environment that may provide images or video (e.g., live) as environmental data. The VR device of user 2 may render a representation of the environment, based on the environmental data, and display the representation for user 2.

The AR device of user 1 may render a representation of user 2 in the environment of user 1. The VR device of user 2 may provide avatar information to the AR device of user 1. For example, the VR device of user 2 may provide the AR device of user 1 with a 3-dimensional (3D) model of an avatar (e.g, selected to represent user 2). Additionally, the VR device of user 2 may provide the AR device of user 1 with control messages indicating actions and/or movements based on inputs from user 2. The AR device of user 1 may render the avatar of user 2 based on the control messages, for example, reflecting the actions and/or movements. For example, user 2 may issue an instruction to have his avatar dance. The AR device of user 1 may render the avatar dancing. Additionally or alternatively, user 2 may instruct movement within the environment of user 1. The AR device of user 1 and/or the VR device of user 2 may move the location within the environment.

To move the location, the AR device of user 1 may move the point to which the avatar of user 2 is anchored. Thereafter, the AR device of user 1 may render the avatar from an updated viewing angle based on the moved point. Additionally, the AR device of user 1 may render the avatar with movement animations. Additionally, the VR device of user 2 may render representations of the environment from the updated location. In this way, the AR device of user 1 and the VR device of user 2 may allow user 2 to "move" in the environment of user 1 and view different portions of the environment and view objects in the environment from different viewing angles.

Similarly, the AR device of user 1 may provide avatar data to the VR device of user 2. The avatar data may include a location of user 1 in the environment, a representation (e.g., 3D model of the avatar), action data and/or movement data. The VR device of user 2 may render the avatar of user 1 in the virtual environment of the VR device of user 2.

In addition to determining a location, the AR device of user 1 and the VR device of user 2 may determine an orientation of the avatar of user 2 in the environment. For example, in some cases, the avatar of user 2 may be facing in the same direction as user 1. In other cases, the avatar of user 2 may be facing toward user 1. How the avatar of user 2 appears in the AR content of user 1 may be based on the determined orientation. Additionally, the view of user 2 of the environment may be based on the orientation of the avatar of user 2. Similar to location, the orientation of the avatar of user 2 may change. For example, user 2 may instruct a change in orientation.

Additionally, in some aspects, the AR device of user 1 and the VR device of user 2 may communicate capability data. For example, the AR device of user 1 and the VR device of user 2 may provide each other with data regarding their respective link qualities, processing capabilities (e.g., a level of detail for rendering content), area restrictions, content restrictions, movement capabilities, interface options, etc. Communications and/or rendering by the AR device of user 1 and/or the VR device of user 2 may be based, at least in part, on the capability data. For example, the AR device of user 1 may select a level of detail for environmental data and/or avatar data to not overtax a communication bandwidth or processing capability of the VR device of user 2. For example, the AR device of user 1 may be capable of generating environmental data having a first resolution. The AR device of user 1 may determine that the VR device of user 2 is not capable of receiving and/or displaying a representation of the environment at the first resolution within at a target display rate. The AR device of user 1 may select a second resolution, for example, lower than the first resolution and generate and/or provide the environmental data to the VR device of user 2 at the second resolution.

Various aspects of the application will be described with respect to the figures below.

FIG. 1 is a diagram illustrating an example extended-reality (XR) system 100, according to aspects of the disclosure. As shown, XR system 100 includes an XR device 102. XR device 102 may implement, as examples, image-capture, object-detection, object-tracking, gaze-tracking, view-tracking, localization (e.g., determining a location of XR device 102), pose-tracking (e.g., tracking a pose of XR device 102), content-generation, content-rendering, computational, communicational, and/or display aspects of extended reality, including virtual reality (VR), augmented reality (AR), and/or mixed reality (MR).

For example, XR device 102 may include one or more scene-facing cameras that may capture images of a scene 112 in which a user 108 uses XR device 102. XR device 102 may detect objects (e.g., object 114) in scene 112 based on the images of scene 112. In some aspects, XR device 102 may include one or more user-facing cameras that may capture images of eyes of user 108. XR device 102 may determine a gaze of user 108 based on the images of user 108. In some aspects, XR device 102 may determine an object of interest (e.g., object 114) in scene 112 (e.g., based on the gaze of user 108, based on object recognition, and/or based on a received indication regarding object 114). XR device 102 may obtain and/or render XR content 116 (e.g., text, images, and/or video) for display at XR device 102. XR device 102 may display XR content 116 to user 108 (e.g., within a field of view 110 of user 108). In some aspects, XR content 116 may be based on the object of interest. For example, XR content 116 may be an altered version of object 114. As another example, XR content 116 may appear to interact with object 114. For example, object 114 may be a tree and XR content 116 may include a monkey climbing the tree.

In some aspects, XR device 102 may display XR content 116 in relation to the view of user 108 of the object of interest. For example, XR device 102 may overlay XR content 116 onto object 114 in field of view 110. In any case, XR device 102 may overlay XR content 116 (whether related to object 114 or not) onto the view of user 108 of scene 112. XR device 102 may anchor XR content 116 to object 114, for example, such that as user 108 moves their head (e.g., changing field of view 110), XR content 116 remains in the line of sight between the eyes of user 108 and object 114.

In a "see-through" configuration, XR device 102 may include a transparent surface (e.g., optical glass) such that XR content 116 may be displayed on (e.g., by being projected onto) the transparent surface to overlay the view of user 108 of scene 112 as viewed through the transparent surface. In a "pass-through" configuration or a "video see-through" configuration, XR device 102 may include a scene-facing camera that may capture images of scene 112. XR device 102 may display images or video of scene 112, as captured by the scene-facing camera, and XR content 116 overlaid on the images or video of scene 112.

In various examples, XR device 102 may be, or may include, a head-mounted device (HMD), a virtual reality headset, and/or smart glasses. XR device 102 may include one or more cameras, including scene-facing cameras and/or user-facing cameras, a GPU, one or more sensors (e.g., such as one or more inertial measurement units (IMUs), image sensors, and/or microphones), one or more communication units (e.g., wireless communication units), and/or one or more output devices (e.g., such as speakers, headphones, displays, and/or smart glass).

Figure 2:
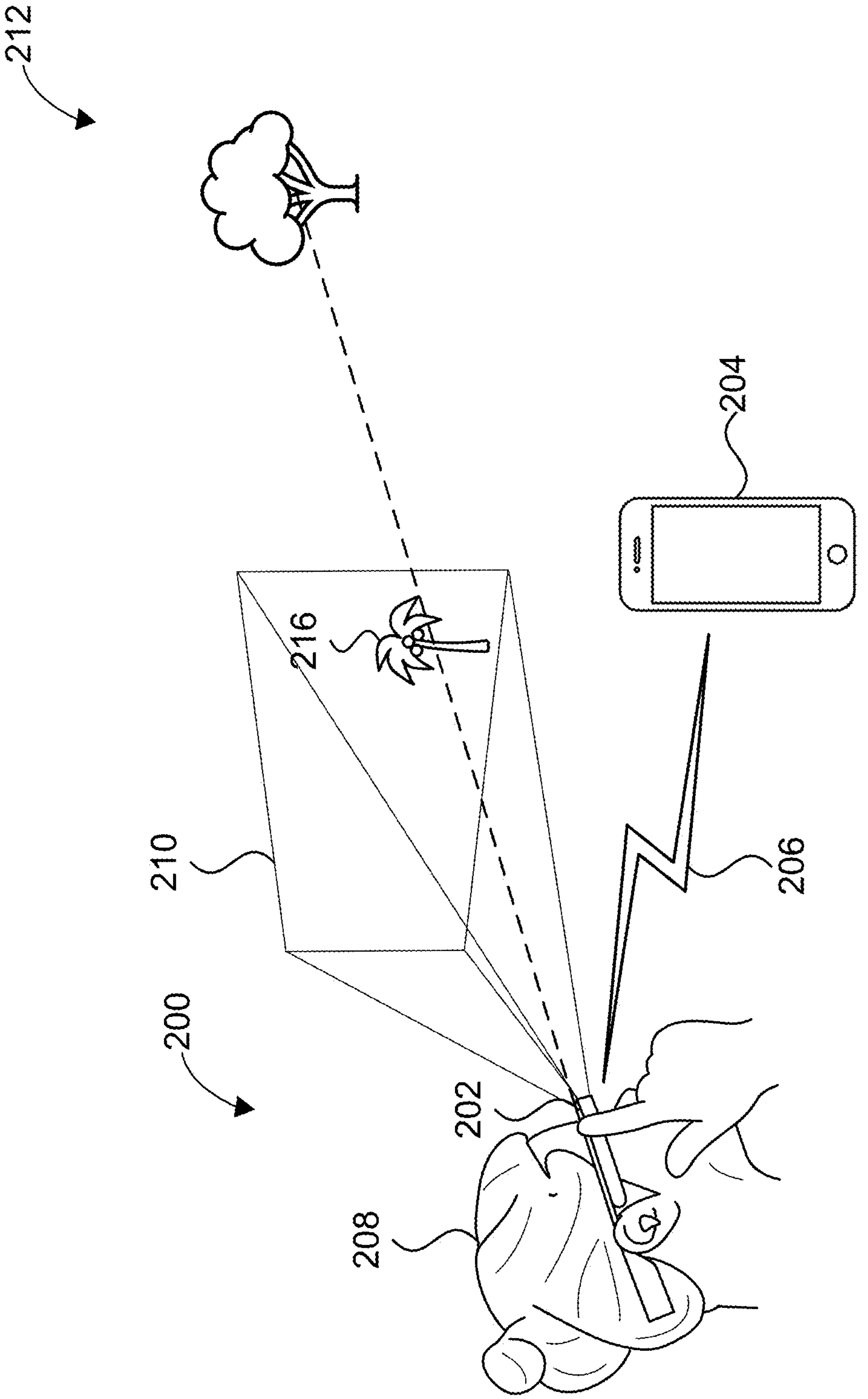
FIG. 2 is a diagram illustrating another example XR system, according to aspects of the disclosure.

FIG. 2 is a diagram illustrating an example extended reality (XR) system 200, according to aspects of the disclosure. In some aspects, an XR device or system may be, or may include, two or more devices. For example, XR system 200 includes a display device 202 and a processing device 204. Display device 202 and processing device 204 implement a communication link 206 between display device 202 and processing device 204. Display device 202 and processing device 204 may collectively implement as examples, image-capture, object-detection, object-tracking, gaze-tracking, view-tracking, localization, pose-tracking, content-generation, content-rendering, computational, communicational, and/or display aspects of XR. For example, display device 202 may implement image-capture, gaze-tracking, view-tracking, localization, pose-tracking, communicational, and/or display aspects of XR. Processing device 204 may implement object-detection, object-tracking, localization, content-generation, content-rendering, computational, communicational, and/or display aspects of XR.

For example, display device 202 may capture and/or generate data, such as image data (e.g., from user-facing cameras and/or scene-facing cameras) and/or motion data (from an inertial measurement unit (IMU)). Display device 202 may provide the data to processing device 204, for example, through communication link 206. Processing device 204 may process the data and/or other data (e.g., data received from another source). For example, processing device 204 may detect, recognize, and/or track objects in scene 212 based on the images of scene 212. Further, processing device 204 may generate (or obtain) XR content 216 to be displayed at display device 202. Processing device 204 may render XR content 216 to be appropriate for display at display device 202 (e.g., based on a pose of display device 202). Processing device 204 may provide XR content 216 to display device 202 through communication link 206 and display device 202 may display XR content 216 in field of view 210 of user 208.

In various examples, display device 202 may be, or may include, a head-mounted display (HMD), a virtual reality headset, and/or smart glasses. Display device 202 may include one or more cameras, including scene-facing cameras and/or user-facing cameras, a GPU, one or more sensors (e.g., such as one or more inertial measurement units (IMUs), image sensors, and/or microphones), and/or one or more output devices (e.g., such as speakers, headphones, displays, and/or smart glass). Processing device 204 may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof. Communication link 206 may be a wireless connection according to any suitable wireless protocol, such as, for example, Institute of Electrical and Electronics Engineers (IEEE) 802.11 (Wi-Fi), IEEE 802.15, or Bluetooth®. In some cases, communication link 206 may be a direct wireless connection between display device 202 and processing device 204. In other cases, communication link 206 may be through one or more intermediary devices, such as, for example, routers or switches and/or across a network.

Figure 3:
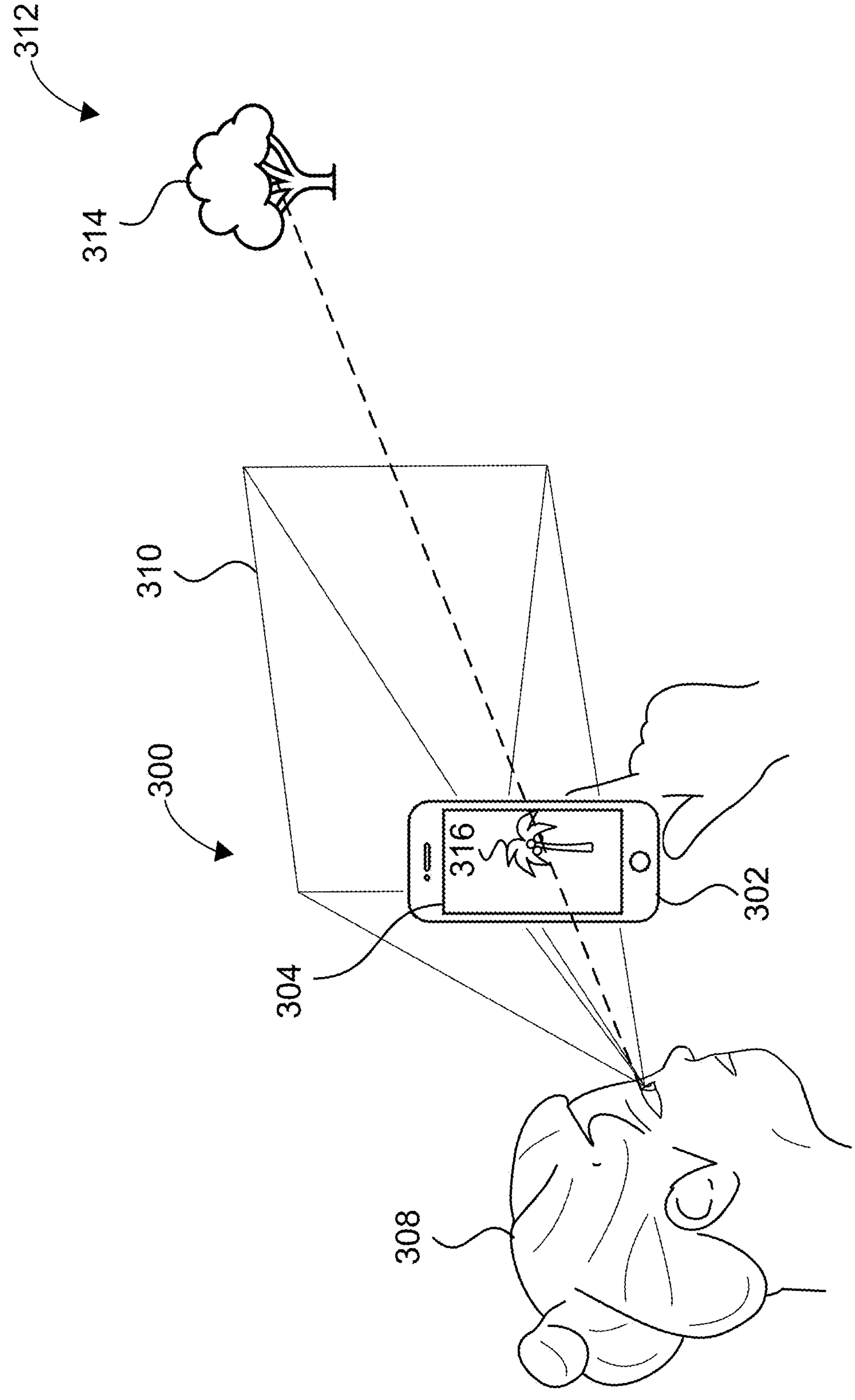
FIG. 3 is a diagram illustrating yet another example XR system, according to aspects of the disclosure.

FIG. 3 is a diagram illustrating an example extended-reality (XR) system 300, according to aspects of the disclosure. As shown, XR system 300 includes an XR device 302 including a display 304. In some cases, XR device 302 may implement, as examples, image-capture, object-detection, object-tracking, gaze-tracking, view-tracking, localization, pose-tracking, content-generation, content-rendering, computational, communicational, and/or display aspects of XR.

For example, XR device 302 may include one or more scene-facing cameras that may capture images of a scene 312 in which a user 308 uses XR device 302. XR device 302 may detect objects (e.g., object 314) in scene 312 based on the images of scene 312. In some aspects, XR device 302 may include one or more user-facing cameras that may capture images of eyes of user 308. XR device 302 may determine a gaze of user 308 and/or a field of view 310 of user 308 based on the images of user 108. In some aspects, XR device 302 may determine an object of interest (e.g., object 314) in scene 312 (e.g., based on the gaze of user 308, based on object recognition, and/or based on a received indication regarding object 314). XR device 302 may obtain and/or render XR content 316 (e.g., text, images, and/or video) for display at display 304. XR device 302 may display XR content 316 to user 308 (e.g., within a field of view 310 of user 308). In some aspects, XR device 302 may determine a position of display 304 relative to field of view 310 of user 308 and scene 312. XR device 302 may track the pose of XR device 302 relative to user 308, field of view 310, and scene 312 such that XR content 316 aligns in field of view 310 of user 308 with scene 312. In some aspects, XR device 302 may capture images at a scene-facing camera and display the images at display 304 (e.g., without tracking field of view 310). XR device 302 may overlay XR content 316 onto the images captured by the scene-facing camera and displayed at display 304.

In some aspects, XR content 316 may be based on the object of interest. For example, XR content 316 may be an altered version of object 314. In some aspects, XR device 302 may display XR content 316 in relation to the view of user 308 of the object of interest. For example, XR device 302 may overlay XR content 316 onto object 314 in field of view 310. In any case, XR device 302 may overlay XR content 316 (whether related to object 314 or not) onto the view of user 308 of scene 312.

XR device 302 may operate in a "pass-through" configuration or a "video see-through" configuration. For example, XR device 302 may include a scene-facing camera that may capture images of the scene of user 308. XR device 302 may display images or video of the scene, as captured by the scene-facing camera, and overlay XR content 316 onto the images or video of the scene. XR device 302 may display the information to be viewed by user 308 in field of view 310 of user 308. In a "see-through" configuration, XR device 302 may include a transparent surface (e.g., optical glass) such that information may be displayed on the transparent surface to overlay the information onto the scene as viewed through the transparent surface.

XR device 302 and/or display 304 may be, or may include, a handheld device, a smartphone, a tablet, or another computing device with a display. XR device 302 include one or more cameras, including scene-facing cameras and/or user-facing cameras, a GPU, one or more sensors (e.g., such as one or more inertial measurement units (IMUs), image sensors, and/or microphones), and/or one or more output devices (e.g., such as speakers, display, and/or smart glass).

Figure 4:
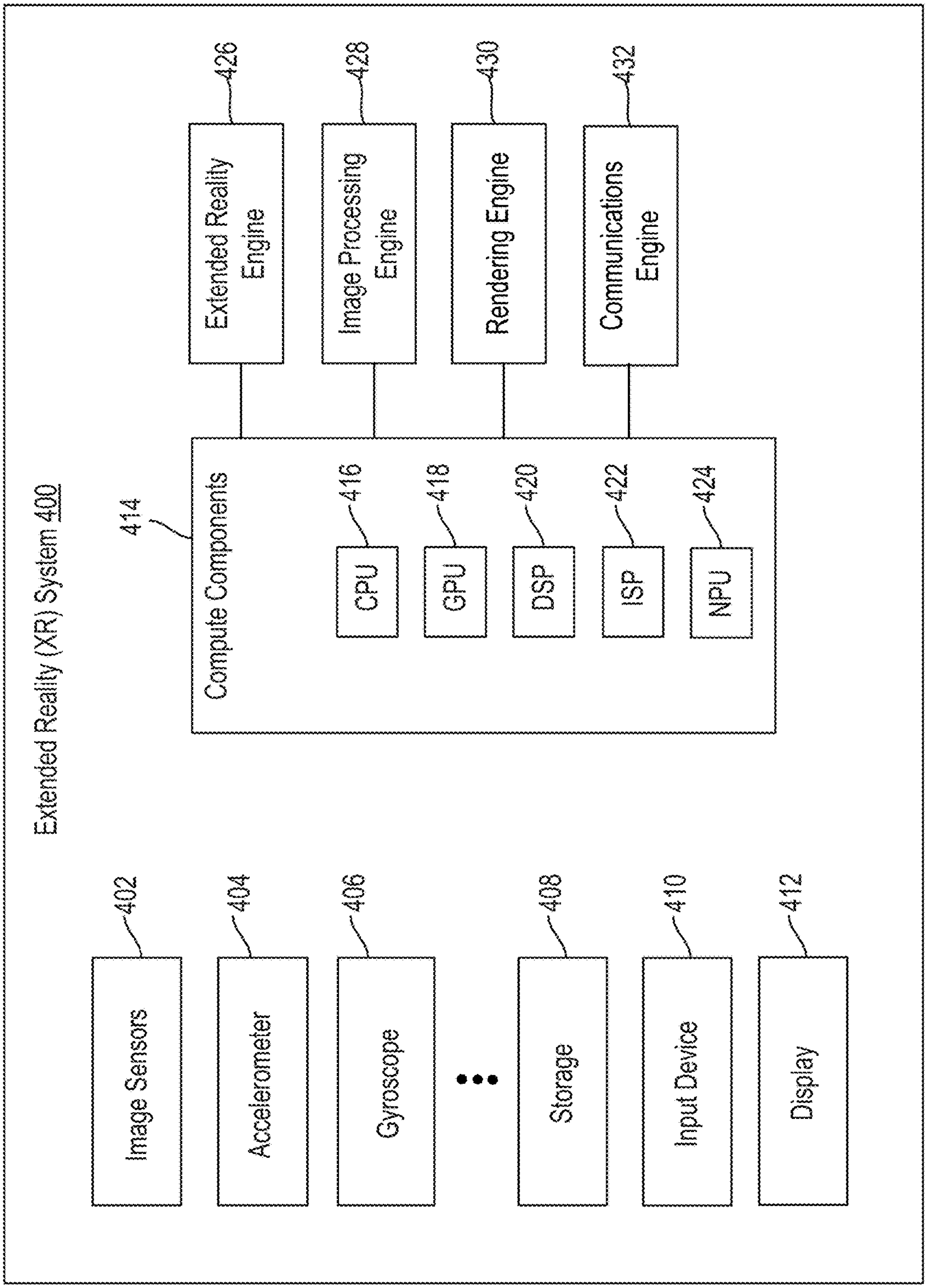
FIG. 4 is a block diagram illustrating an architecture of an example XR system, in accordance with some aspects of the disclosure.

FIG. 4 is a diagram illustrating an architecture of an example extended reality (XR) system 400, in accordance with some aspects of the disclosure. XR system 400 may execute XR applications and implement XR operations. XR system 400 may be an example of, or be included in, any of XR device 102 of FIG. 1, display device 202 and/or processing device 204 of FIG. 2, and/or XR device 302 of FIG. 3.

In this illustrative example, XR system 400 includes one or more image sensors 402, an accelerometer 404, a gyroscope 406, storage 408, an input device 410, a display 412, Compute components 414, an XR engine 426, an image processing engine 428, a rendering engine 430, and a communications engine 432. It should be noted that the components 402-432 shown in FIG. 4 are non-limiting examples provided for illustrative and explanation purposes, and other examples may include more, fewer, or different components than those shown in FIG. 4. For example, in some cases, XR system 400 may include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one or more other processing engines, one or more other hardware components, and/or one or more other software and/or hardware components that are not shown in FIG. 4. While various components of XR system 400, such as image sensor 402, may be referenced in the singular form herein, it should be understood that XR system 400 may include multiple of any component discussed herein (e.g., multiple image sensors 402).

Display 412 may be, or may include, a glass, a screen, a lens, a projector, and/or other display mechanism that allows a user to see the real-world environment and also allows XR content to be overlaid, overlapped, blended with, or otherwise displayed thereon.

XR system 400 may include, or may be in communication with, (wired or wirelessly) an input device 410. Input device 410 may include any suitable input device, such as a touchscreen, a pen or other pointer device, a keyboard, a mouse, a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, image sensor 402 may capture images that may be processed for interpreting gesture commands.

XR system 400 may also communicate with one or more other electronic devices (wired or wirelessly). For example, communications engine 432 may be configured to manage connections and communicate with one or more electronic devices. In some cases, communications engine 432 may correspond to communication interface 1226 of FIG. 12.

In some implementations, image sensors 402, accelerometer 404, gyroscope 406, storage 408, display 412, compute components 414, XR engine 426, image processing engine 428, and rendering engine 430 may be part of the same computing device. For example, in some cases, image sensors 402, accelerometer 404, gyroscope 406, storage 408, display 412, compute components 414, XR engine 426, image processing engine 428, and rendering engine 430 may be integrated into an HMD, extended reality glasses, smartphone, laptop, tablet computer, gaming system, and/or any other computing device. However, in some implementations, image sensors 402, accelerometer 404, gyroscope 406, storage 408, display 412, compute components 414, XR engine 426, image processing engine 428, and rendering engine 430 may be part of two or more separate computing devices. For instance, in some cases, some of the components 402-432 may be part of, or implemented by, one computing device and the remaining components may be part of, or implemented by, one or more other computing devices. For example, such as in a split perception XR system, XR system 400 may include a first device (e.g., an HMD), including display 412, image sensor 402, accelerometer 404, gyroscope 406, and/or one or more compute components 414. XR system 400 may also include a second device including additional compute components 414 (e.g., implementing XR engine 426, image processing engine 428, rendering engine 430, and/or communications engine 432). In such an example, the second device may generate virtual content based on information or data (e.g., images, sensor data such as measurements from accelerometer 404 and gyroscope 406) and may provide the virtual content to the first device for display at the first device. The second device may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Storage 408 may be any storage device(s) for storing data. Moreover, storage 408 may store data from any of the components of XR system 400. For example, storage 408 may store data from image sensor 402 (e.g., image or video data), data from accelerometer 404 (e.g., measurements), data from gyroscope 406 (e.g., measurements), data from compute components 414 (e.g., processing parameters, preferences, virtual content, rendering content, scene maps, tracking and localization data, object detection data, privacy data, XR application data, face recognition data, occlusion data, etc.), data from XR engine 426, data from image processing engine 428, and/or data from rendering engine 430 (e.g., output frames). In some examples, storage 408 may include a buffer for storing frames for processing by compute components 414.

Compute components 414 may be, or may include, a central processing unit (CPU) 416, a graphics processing unit (GPU) 418, a digital signal processor (DSP) 420, an image signal processor (ISP) 422, a neural processing unit (NPU) 424, which may implement one or more trained neural networks, and/or other processors. Compute components 414 may perform various operations such as image enhancement, computer vision, graphics rendering, extended reality operations (e.g., tracking, localization, pose estimation, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, compute components 414 may implement (e.g., control, operate, etc.) XR engine 426, image processing engine 428, and rendering engine 430. In other examples, compute components 414 may also implement one or more other processing engines.

Image sensor 402 may include any image and/or video sensors or capturing devices. In some examples, image sensor 402 may be part of a multiple-camera assembly, such as a dual-camera assembly. Image sensor 402 may capture image and/or video content (e.g., raw image and/or video data), which may then be processed by compute components 414, XR engine 426, image processing engine 428, and/or rendering engine 430 as described herein.

In some examples, image sensor 402 may capture image data and may generate images (also referred to as frames) based on the image data and/or may provide the image data or frames to XR engine 426, image processing engine 428, and/or rendering engine 430 for processing. An image or frame may include a video frame of a video sequence or a still image. An image or frame may include a pixel array representing a scene. For example, an image may be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, image sensor 402 (and/or other camera of XR system 400) may be configured to also capture depth information. For example, in some implementations, image sensor 402 (and/or other camera) may include an RGB-depth (RGB-D) camera. In some cases, XR system 400 may include one or more depth sensors (not shown) that are separate from image sensor 402 (and/or other camera) and that may capture depth information. For instance, such a depth sensor may obtain depth information independently from image sensor 402. In some examples, a depth sensor may be physically installed in the same general location or position as image sensor 402 but may operate at a different frequency or frame rate from image sensor 402. In some examples, a depth sensor may take the form of a light source that may project a structured or textured light pattern, which may include one or more narrow bands of light, onto one or more objects in a scene. Depth information may then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

XR system 400 may also include other sensors in its one or more sensors. The one or more sensors may include one or more accelerometers (e.g., accelerometer 404), one or more gyroscopes (e.g., gyroscope 406), and/or other sensors. The one or more sensors may provide velocity, orientation, and/or other position-related information to compute components 414. For example, accelerometer 404 may detect acceleration by XR system 400 and may generate acceleration measurements based on the detected acceleration. In some cases, accelerometer 404 may provide one or more translational vectors (e.g., up/down, left/right, forward/back) that may be used for determining a position or pose of XR system 400. Gyroscope 406 may detect and measure the orientation and angular velocity of XR system 400. For example, gyroscope 406 may be used to measure the pitch, roll, and yaw of XR system 400. In some cases, gyroscope 406 may provide one or more rotational vectors (e.g., pitch, yaw, roll). In some examples, image sensor 402 and/or XR engine 426 may use measurements obtained by accelerometer 404 (e.g., one or more translational vectors) and/or gyroscope 406 (e.g., one or more rotational vectors) to calculate the pose of XR system 400. As previously noted, in other examples, XR system 400 may also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors may include at least one IMU. An IMU is an electronic device that measures the specific force, angular rate, and/or the orientation of XR system 400, using a combination of one or more accelerometers, one or more gyroscopes, and/or one or more magnetometers. In some examples, the one or more sensors may output measured information associated with the capture of an image captured by image sensor 402 (and/or other camera of XR system 400) and/or depth information obtained using one or more depth sensors of XR system 400.

The output of one or more sensors (e.g., accelerometer 404, gyroscope 406, one or more IMUs, and/or other sensors) can be used by XR engine 426 to determine a pose of XR system 400 (also referred to as the head pose) and/or the pose of image sensor 402 (or other camera of XR system 400). In some cases, the pose of XR system 400 and the pose of image sensor 402 (or other camera) can be the same. The pose of image sensor 402 refers to the position and orientation of image sensor 402 relative to a frame of reference (e.g., with respect to a field of view 110 of FIG. 1). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees of Freedom (3DoF), which refers to the three angular components (e.g. roll, pitch, and yaw).

In some cases, a device tracker (not shown) can use the measurements from the one or more sensors and image data from image sensor 402 to track a pose (e.g., a 6DoF pose) of XR system 400. For example, the device tracker can fuse visual data (e.g., using a visual tracking solution) from the image data with inertial data from the measurements to determine a position and motion of XR system 400 relative to the physical world (e.g., the scene) and a map of the physical world. As described below, in some examples, when tracking the pose of XR system 400, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of XR system 400 within the scene and the 3D map of the scene, etc. The 3D map can provide a digital representation of a scene in the real/physical world. In some examples, the 3D map can anchor position-based objects and/or content to real-world coordinates and/or objects. XR system 400 can use a mapped scene (e.g., a scene in the physical world represented by, and/or associated with, a 3D map) to merge the physical and virtual worlds and/or merge virtual content or objects with the physical environment.

In some aspects, the pose of image sensor 402 and/or XR system 400 as a whole can be determined and/or tracked by compute components 414 using a visual tracking solution based on images captured by image sensor 402 (and/or other camera of XR system 400). For instance, in some examples, compute components 414 can perform tracking using computer vision-based tracking, model-based tracking, and/or simultaneous localization and mapping (SLAM) techniques. For instance, compute components 414 can perform SLAM or can be in communication (wired or wireless) with a SLAM system (not shown). SLAM refers to a class of techniques where a map of an environment (e.g., a map of an environment being modeled by XR system 400) is created while simultaneously tracking the pose of a camera (e.g., image sensor 402) and/or XR system 400 relative to that map. The map can be referred to as a SLAM map and can be three-dimensional (3D). The SLAM techniques can be performed using color or grayscale image data captured by image sensor 402 (and/or other camera of XR system 400) and can be used to generate estimates of 6DoF pose measurements of image sensor 402 and/or XR system 400. Such a SLAM technique configured to perform 6DoF tracking can be referred to as 6DoF SLAM. In some cases, the output of the one or more sensors (e.g., accelerometer 404, gyroscope 406, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 402 (and/or other camera) to the SLAM map. For example, 6DoF SLAM can use feature point associations from an input image to determine the pose (position and orientation) of the image sensor 402 and/or XR system 400 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 402 and/or the XR system 400 can be determined by projecting features from the 3D SLAM map into an image or video frame and updating the camera pose from verified 2D-3D correspondences.

In one illustrative example, the compute components 414 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 414 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 400 can also track the hand and/or fingers of the user to allow the user to interact with and/or control virtual content in a virtual environment. For example, the XR system 400 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 5:
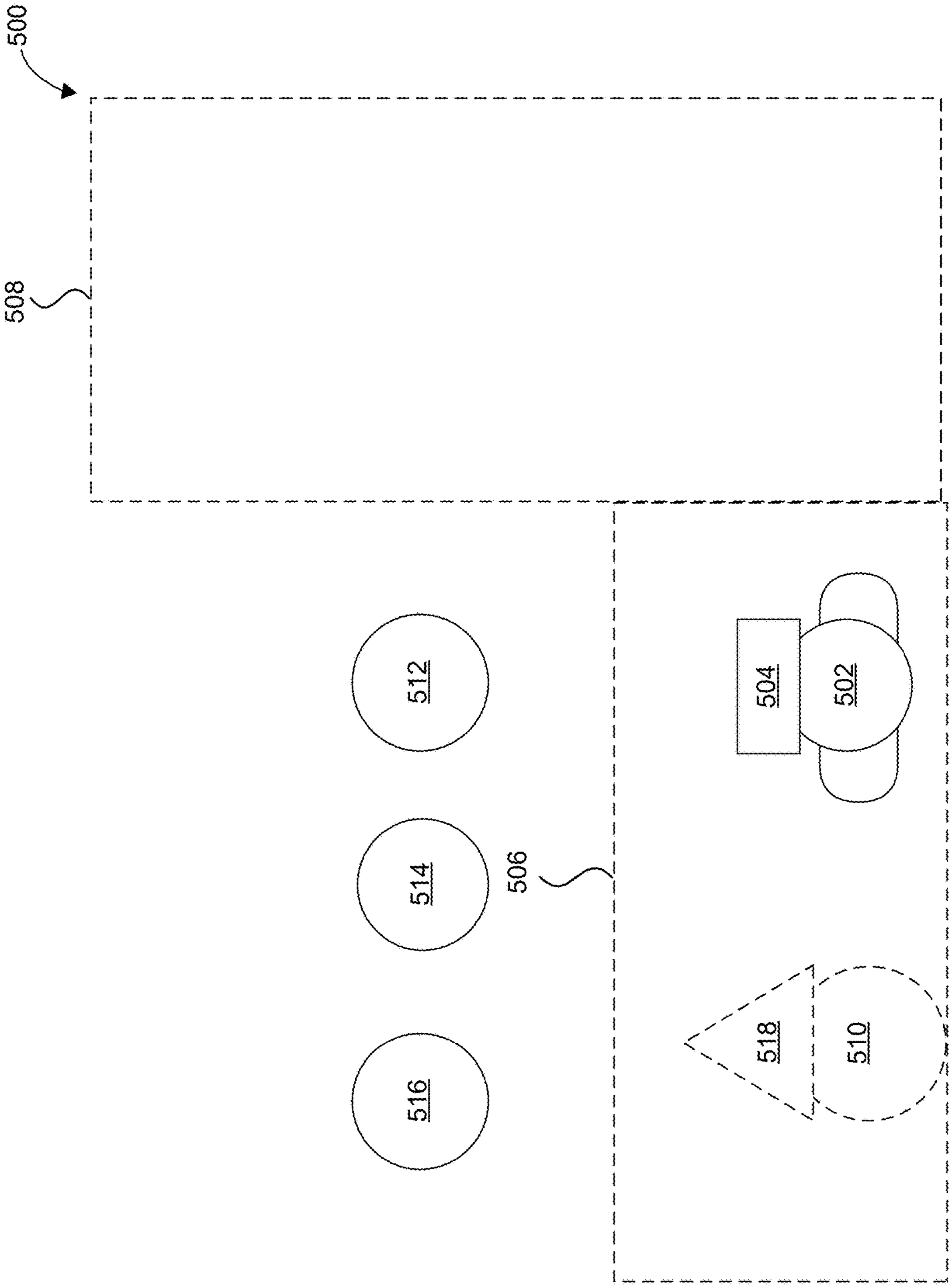
FIG. 5 is a diagram illustrating a first view of an example environment in which an example user uses an example XR device, according to various aspects of the present disclosure.

FIG. 5 is a diagram illustrating a first view of an example environment 500 in which an example user 502 uses an example XR device 504, according to various aspects of the present disclosure. XR device 504 may be an AR device for displaying virtual content. For example, user 502 may use XR device 504 to view the virtual content in addition to viewing environment 500.

Environment 500 may include an object 512, an object 514, and an object 516, which may be objects or people in the real world. A person in environment 500 (e.g., user 502) may view object 512, object 514, and/or object 516 (unless any of object 512, object 514, or object 516 is overlaid with virtual content by XR device 504). User 502, XR device 504, object 512, object 514, and object 516 are illustrated in FIG. 5 using solid lines to indicate that user 502, XR device 504, object 512, object 514, and object 516 are real-world objects present in environment 500. A region 506, a region 508, a location 510, and an orientation 518 are illustrated in FIG. 5 using dashed lines to indicate that region 506, region 508, location 510, and orientation 518 are conceptual and may not be visibly distinct to a person in environment 500.

XR device 504 may obtain a location 510 in environment 500 and an orientation 518 for another XR device of another user. In some cases, XR device 504 may determine location 510 and orientation 518 and transmit an indication of location 510 and orientation 518 to the other XR device. In other cases, XR device 504 may determine a region 506 of environment 500 and provide an indication of region 506 to the other XR device. Region 506 may be a suitable location for an avatar of another XR device to be anchored (at least initially). For example, region 506 may be mostly unoccupied by other objects (including people, and virtual objects). The other XR device may determine location 510 and orientation 518 based on region 506 (e.g., determine location 510 within region 506). The other XR device may then transmit an indication of location 510 and orientation 518 to XR device 504.

Location 510 may be an initial location for the other XR device and orientation 518 may be an initial orientation of the other XR device. For example, location 510 may be a "spawn" location for the other XR device. In some aspects, the other XR device may virtually move and/or reorient within environment 500. In some cases, XR device 504 may define a region 506 as a region in which the other XR device can virtually move and/or a region 508 into which the other XR device cannot virtually move. For example, region 506 may include a seat at a venue or a playing field in a park.

In some aspects, location 510 may be within a threshold range of XR device 504. For example, location 510 may be determined to be to within 10 meters of XR device 504. For instance region 506 may define a circle around XR device 504 with a 10-meter radius. In some cases, region 506 may be defined by a current location of XR device 504, for example, as XR device 504 moves within environment 500.

Orientation 518 may be determined in a number of ways. For example, orientation 518 may be determined to be the same as the orientation of XR device 504 relative to a reference direction (e.g., north) or a reference point in environment 500 (e.g., a stage or a point on a field of play). Alternatively, orientation 518 may be determined to be toward XR device 504. As another alternative, orientation 518 may be based on an orientation of the other XR device, for example, relative to a reference direction (e.g., north) or relative to XR device 504.

In some cases, location 510 may be relative to XR device 504. For example, location 510 may be defined as 1 meter away from XR device 504 at a bearing of 270° from directly in front of XR device 504. In other cases, location 510 may be relative to a reference coordinate system (e.g., latitude and longitude). For example, XR device 504 may determine a location of XR device 504 using radio frequency (RF) technologies, such as global positioning system (GPS) in an outdoor setting, or Institute of Electrical and Electronics Engineers (IEEE) 802.11 (WiFi) or ultra-wide band (UWB) in an indoor setting. XR device 504 may then location 510 in the reference coordinate system.

In some aspects, location 510 may be defined based on another device. For example, location 510 may be determined to be the location of another device, such as another XR device, another user equipment (UE), such as a phone, or a dedicated device in environment 500. For example, a dedicated device may also be deployed in environment 500 (for instance, a UWB radio may be mounted on the wall of a room inside a Sandbox VR studio). In this case, the other device's relative location with regard to XR device 504 may be determined using relative positioning (such as UWB or WiFi time of arrival (ToA) and angle of arrival (AoA).

In the case of multiple XR users seeking to interact with user 502, a limit may be imposed on the number of other XR users that are allowed to select the same location (e.g., the same point in region 506 or the same dedicated device). This would prevent too many XR users from appearing at the same reference location.

Figure 6:
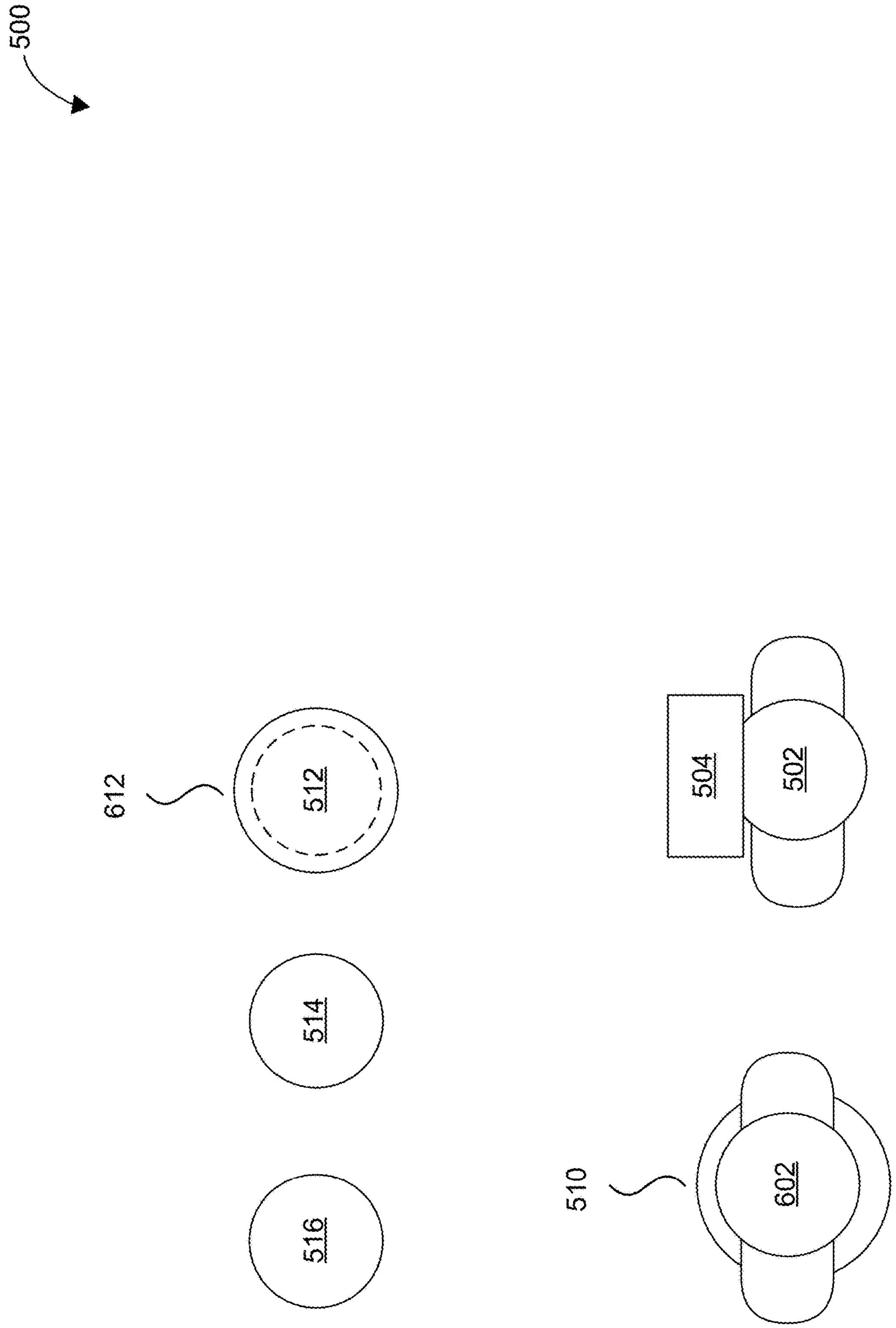
FIG. 6 is a diagram illustrating a second view of the example environment of FIG. 5 in which the user uses the XR device, according to various aspects of the present disclosure.

FIG. 6 is a diagram illustrating a second view of the example environment 500 of FIG. 5 in which user 502 uses XR device 504, according to various aspects of the present disclosure. FIG. 6 includes real-world objects (e.g., object 514 and object 516) and virtual content that may be displayed to user 502 by XR device 504.

For example, user 502 may see object 514 and object 516 through XR device 504. For example, XR device 504 may include a see-through display through which user 502 can see object 514 and object 516. Alternatively, XR device 504 may be operating in a video-see-through mode and may capture images of object 514 and object 516 and display the images to user 502.

Additionally, XR device 504 may display virtual content to user 502. For example, XR device 504 may display virtual content 612 to user 502. Virtual content 612 may be positioned in the field of view of user 502 over object 512. As such, user 502 may be able to see virtual content 612 but not object 512.

Similarly, XR device 504 may display avatar 602 to user 502. Avatar 602 may be a representation of another user of another XR device. In some aspects, the other XR device of the other user may provide avatar 602 (or an indication of avatar 602) to XR device 504. For example, the other user may generate or select avatar 602 and provide a digital representation of avatar 602 to XR device 504. Avatar 602 may be located (at least initially) at location 510. For example, avatar 602 may "spawn" at location 510.

Avatar 602 may be rendered as if avatar 602 were at location 510. In other words, avatar 602 may be anchored (at least initially) to location 510.

The appearance of avatar 602 to user 502 may be based on location 510. For example, the size of avatar 602 may depend on a distance between location 510 and XR device 504. Additionally, a viewing angle from which avatar 602 is viewed by XR device 504 may depend on the relative position of location 510 and XR device 504.

Additionally or alternatively, in some aspects, the appearance of avatar 602 may be based on a lighting in environment 500. For example, if environment 500 is dimly lit, XR device 504 may render avatar 602 as dimly lit. However, if environment 500 is brightly lit, XR device 504 may render avatar 602 as brightly lit.

Avatar 602 may have an orientation. The initial orientation of avatar 602 may be based on orientation 518 of FIG. 5. The appearance of avatar 602 to user 502 may be based on the orientation of avatar 602.

Figure 7:
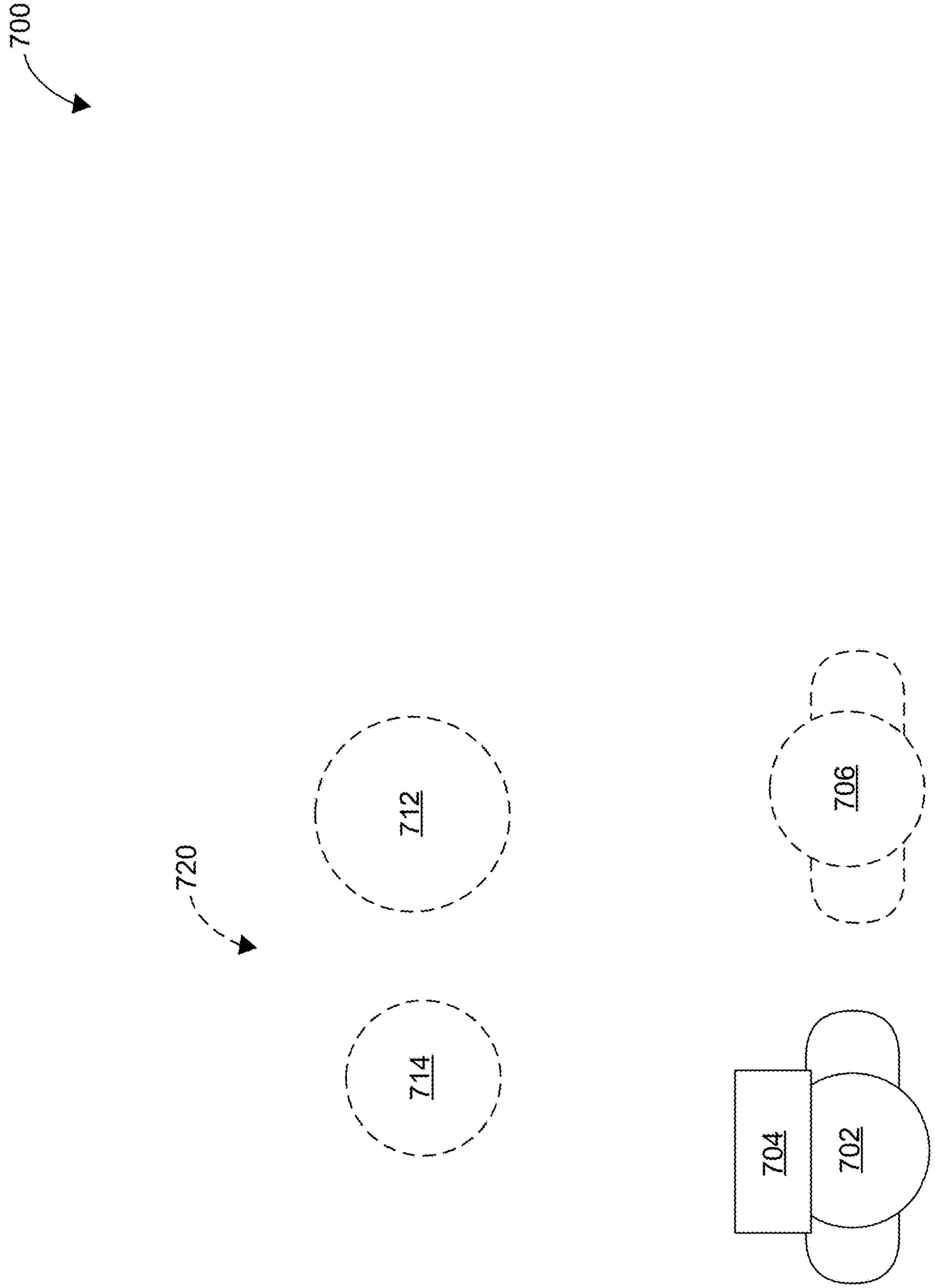
FIG. 7 is a diagram illustrating a view of an example environment in which a user uses an XR device, according to various aspects of the present disclosure.

FIG. 7 is a diagram illustrating a view of an example environment 700 in which user 702 uses XR device 704, according to various aspects of the present disclosure. FIG. 7 includes virtual content that may be displayed to user 702 by XR device 704. XR device 704 may be a VR device for displaying virtual content. XR device 704 may obstruct, partially or entirely, a view of user 702 of environment 700. For example, user 702 may be able to see virtual content displayed by XR device 704 and not real-world objects in environment 700.

XR device 704 may display virtual content to user 702 that simulates environment 500 of user 502 of FIG. 5. For example, XR device 704 may display virtual content 714 to user 702. Virtual content 714 may be based on object 514 of FIG. 5. For example, XR device 504 may capture images of object 514. In some aspects, XR device 504 may render a 3D model of object 514. XR device 704 may obtain the images of object 514 or the 3D model of object 514 and render virtual content 714 based on the images or the 3D model. In this way, XR device 704 may display a representation 720 of environment 500 to user 702.

As another example, XR device 504 may determine coordinates of environment 500 and provide the coordinates to XR device 704. XR device 704 may obtain environmental data (e.g., including video, images, and/or 3D models) representative of environment 500 (e.g., from a server) and render representation 720 based on the environmental data. For example, a server may store images and/or 3D models representative of environment 500. The server may provide the images and/or 3D models to XR device 704 as environmental data. As another example, there may be a camera in environment 500 that may capture images or video of environment 500. The camera may be a stationary camera (e.g., a traffic camera, a surveillance camera, a camera positioned in a venue to capture performances in the venue). Alternatively, the camera may be part of a user device, such as a XR device or smartphone. The camera may upload images or video of environment 500 (e.g., to a server) and XR device 704 may download the images and/or video.

XR device 504 and XR device 704 may share common virtual content. For example, virtual content 712 may be related to virtual content 612 of FIG. 6. For instance, virtual content 712 may be the same as virtual content 612. Alternatively, virtual content 712 may be similar to virtual content 612, for example, having the shape as virtual content 612 but a different color, size, etc.

The appearance of representation 720 to user 702 may be based on location 510 and orientation 518. For example, XR device 704 may render representation 720 of environment 500 based on location 510 in environment 500 and orientation 518 relative to environment 500. For example, virtual content 714 may appear different to user 702 than object 514 appears to XR device 504 based on the different views of object 514 from XR device 504 and location 510.

Additionally, XR device 704 may render an avatar 706 representative of user 502 in representation 720. XR device 504 may provide avatar 706 to XR device 704. The appearance of avatar 706 to user 702 may be based on the relative location of location 510 and XR device 504 in environment 500. For example, XR device 704 may render avatar 706 in representation 720 as if avatar 706 were at the location of XR device 504 in environment 500. As such, the size of avatar 706 and the viewing angle from which user 702 views avatar 706 may be based on a distance and a direction between XR device 504 and location 510.

In some aspects, user 702 may be able to cause avatar 602 to move and/or perform actions within environment 500. For example, user 702 may use a controller, treadmill, omnidirectional treadmill, motion-tracking devices, etc. to instruct avatar 602 to move. User 702 moving avatar 602 (or causing avatar 602 to perform an action) may involve XR device 704 sending a control message to XR device 504 indicating the movement or action. XR device 504 may render avatar 602 as moving or performing actions based on the control messages. Moving avatar 602 may involve moving the point to which avatar 602 is anchored. Thereafter, XR device 504 may render avatar 602 from an updated viewing angle based on the moved point. Additionally, XR device 504 may render avatar 602 with movement animations. Additionally, XR device 704 may render representation 720 of environment 500 from the perspective of the moved point. In this way, XR device 504 and XR device 704 may allow user 702 to "move" in environment 500 and view different portions of environment 500 and view objects in environment 500 from different viewing angles.

Similarly, as user 502 moves XR device 504 in environment 500, XR device 704 may render avatar 706 as moving and render avatar 706 in representation 720 based on the new position of XR device 504 in environment 500.

The exchange of data between XR device 504 and XR device 704 and/or the rendering of image data by XR device 504 and/or XR device 704 may be based on the capabilities of XR device 504 and XR device 704. For example, XR device 704 may transmit capability data to XR device 504. XR device 504 may determine data (e.g., environmental data and/or avatar data) to transmit to XR device 704 based on the capability data. For example, XR device 504 may determine, based on the capabilities of XR device 704, a level of detail for the environmental data to send to XR device 704. Similarly, XR device 504 may transmit capability data to XR device 704 and XR device 704 may determine avatar data to send to XR device 504 based on the capabilities of XR device 504.

XR device 504 may transmit capability data including data indicative of: link quality (e.g., a data rate in megabytes per second (Mbps), latency in milliseconds (ms), jitter in ms, etc.), a feasible area (e.g., region 506, for example, specified with regard to location 510) available for exploration by avatar 602, level of detail in environmental data representative of the real world (which may be highly controlled such as in a VR/AR studio, or much more random such as in an outdoor venue i.e. concert, museum, etc.), and/or real-world features permissible for display (for example, certain objects in the real-world may not be displayed to user 702, such as buildings or other people in the background).

XR device 704 may transmit capability data including data indicative of: link quality, levels of detail of the avatar 602, a rendering capability of XR device 704, and/or interfaces user 702 uses to interact with XR device 704. For example, the capability data may include indications of whether user 702 is using a headset, a joystick, a treadmill, and/or an omnidirectional treadmill. Further, the capability data may include indications of an extent of treadmill capabilities such as whether there is a harness equipped, and/or a range of rotation (0-360 degrees) of the treadmill.

Representation 720 may not include virtual content corresponding to object 516. For example, in some cases, XR device 504 may determine not to share a representation of object 516 with XR device 704. For example, object 516 may be a person in environment 500. Based on privacy laws or concerns, XR device 504 may determine to not provide environmental data based on object 516 to XR device 704.

Additionally or alternatively, a pre-determined group of offensive gestures may be blocked from being display to user 502 and/or user 702 in the interest of censorship. For example, certain types of motions/movements performed by user 502 and/or user 702 may be flagged and not reflected in their avatars.

In some aspects, the mobility of the avatar 602 in environment 500 may be adapted. For example, an omnidirectional treadmill used by user 702 may be constrained to allow movement in a limited region (e.g, object 516), such as within a threshold range or field-of-view of XR device 504. For instance, avatar 602 may be allowed to move forward towards a door, since that is the only available/allowable path to take in the real world.

Additionally or alternatively, in some aspects, to prevent cyber-stalking, avatar 602 may not be allowed to approach too close to XR device 504. For example, a minimum distance bound between XR device 504 and avatar 602 may be imposed.

In some aspects, as opposed to virtual content 712 being similar to virtual content 612 both users may see the VR content differently. For example, initially virtual content that XR device 504 displays to user 502 may be limited. For instance, XR device 504 may display no virtual content such that user 502 view environment 500. However, XR device 704 may display virtual content in addition to representation 720 of environment 500. For example, user 502 and user 702 may play a two-player game in which user 502 and user 702 can achieve certain tasks to unlock virtual content that are embedded at given locations in the real world.

For instance, at a certain location in the real world, user 502 and user 702 can unlock a mini-VR world. XR device 504 would display a view of the same VR content being seen by user 702. After completing a task in the mini-VR world, user 502 and user 702 may return to the real-world view, in other words, XR device 504 would resume displaying little or no virtual content and XR device 704 would resume displaying representation 720 of environment 500. As another example, user 502 and user 702 may visit certain waypoints at a concert where a VR world allows both users to experience unique content specific to a certain musical artist.

In the event that the VR world is much more expansive than the real-world, the motion of user 502 in the VR world may be made much faster/slower (as compared to his/her actual footsteps) and vice-versa for user 702.

Figure 8:
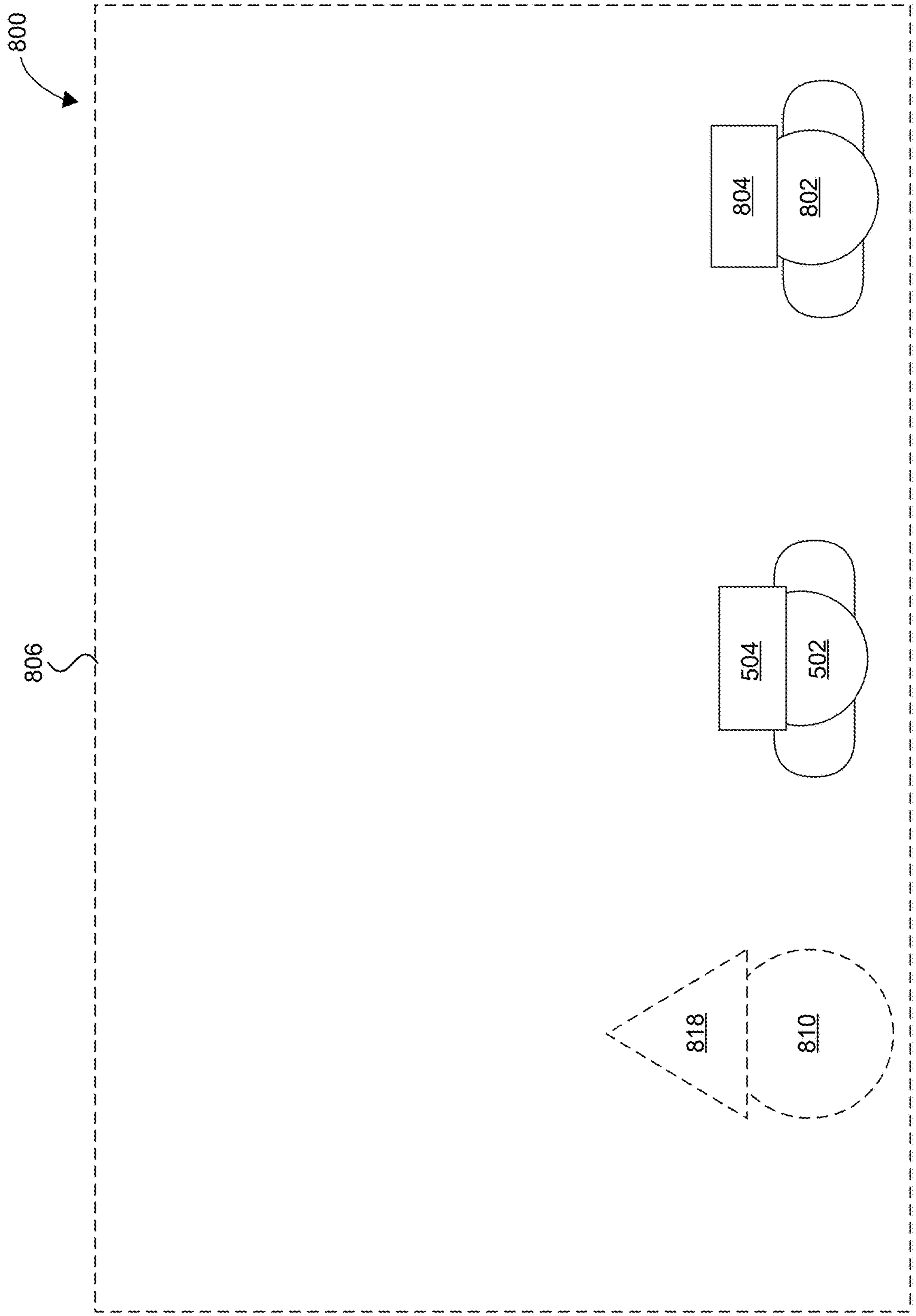
FIG. 8 is a diagram illustrating an example environment in which an example user uses an example XR device, and another example user uses another example XR device, according to various aspects of the present disclosure.

FIG. 8 is a diagram illustrating an example environment 800 in which an example user 502 uses an example XR device 504 and an example user 802 uses an example XR device 804, according to various aspects of the present disclosure. FIG. 8 includes two example users (e.g., user 502 and user 802) physically present in environment 800 as an example. Systems and techniques described herein may apply to any number of XR devices and/or XR device users physically present in an environment. Similarly, the description of FIG. 8 relates to another XR device user that virtually interacts with user 502 and user 802 as an example. The systems and techniques may apply to any number of other XR devices and other XR device users.

XR device 504, XR device 804, and/or another XR device may determine a region 806, a location 810, and/or an orientation 818 for the other XR device in environment 800. XR device 504, XR device 804, and the other XR device may together determine region 806, location 810, and/or orientation 818 in substantially the same way that XR device 504 of FIG. 5 determined region 506, location 510, and orientation 518 of FIG. 5.

For example, XR device 504 and/or XR device 804 may determine region 806 and/or location 810 based on the location of XR device 504 and the location of XR device 804. For example, region 806 may be defined as a region around either or both of XR device 504 and XR device 804. Location 810 may be a location within region 806 selected by any of XR device 504, XR device 804, or the other XR device.

As an example, the other XR device's virtual location (within environment 800) may be limited to within a threshold range (min/max) of any or all the AR users i.e. say not more than 10 meters away and not within 1 meter from any of the XR users physically present in environment 800 (e.g., XR device 504 and XR device 804). Similarly, the other XR device's location may always be limited to within a threshold combined field-of-view of any or all the AR users. Additionally or alternatively, the other XR device's mobility may be constrained as per the above threshold such as limiting the operating range of the omnidirectional treadmill being used by the other XR user. Determining region 806 may involve relative positions and orientations/angle of arrival measurements amongst the XR devices present in environment 800.

Furthermore, the nature of the other XR user's projection (e.g., the avatar of the other XR user) and/or the content seen by the other XR user may be adapted on the basis of the relative range/field-of-view amongst the XR users present in environment 800. For instance, when the XR device 504 and XR device 804 are within 2 meters of range or within 10 degrees of each other's field-of-view, the other XR device may be presented with additional content (a new object may be displayed). Similarly, XR device 504 and XR device 804 may see the other XR user's projection in a different way (grows in size, levels up to a new character).

Figure 9:
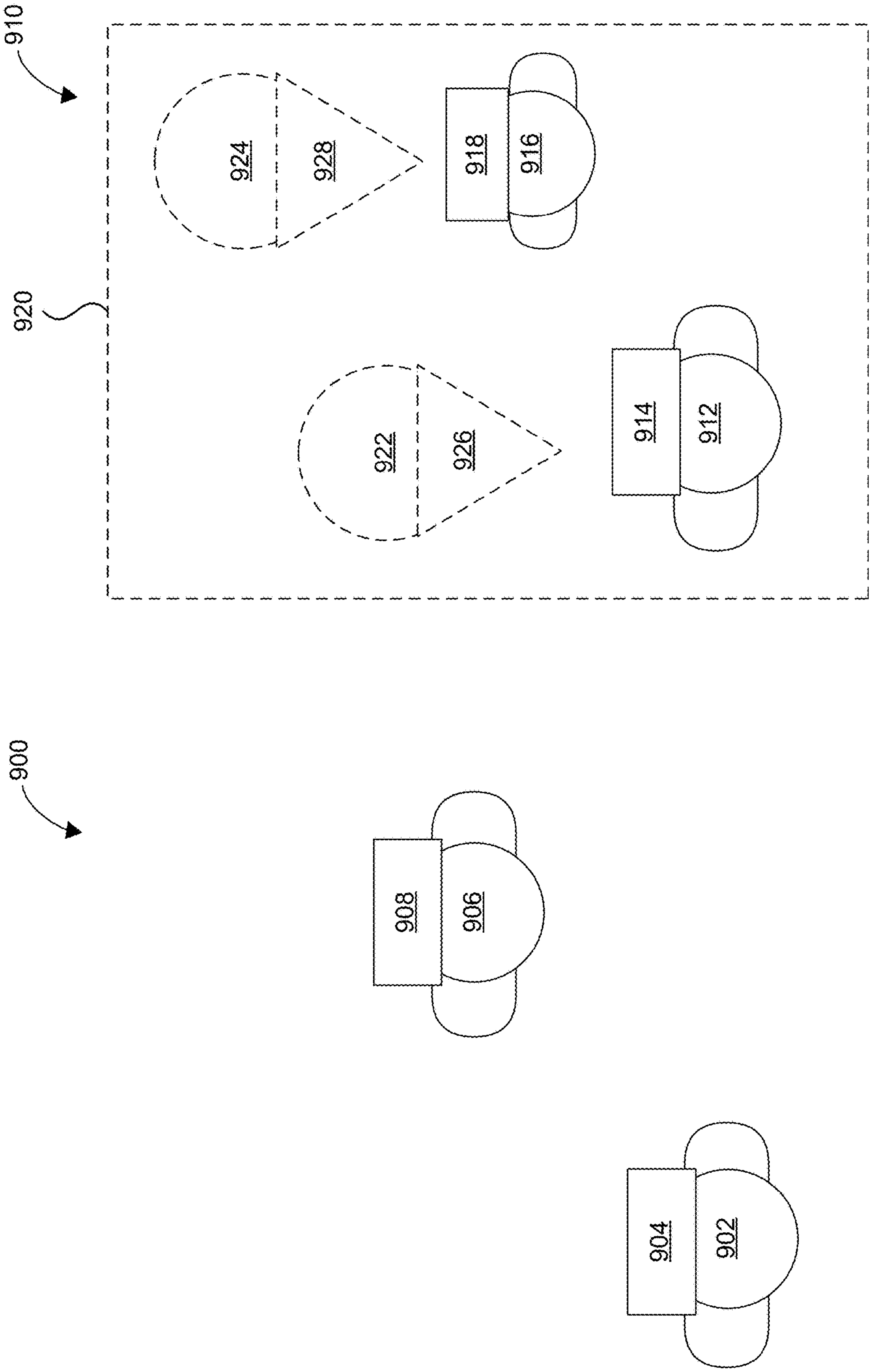
FIG. 9 is a diagram illustrating two example XR users in a first example environment and two example XR users in a second example environment, according to various aspects of the present disclosure.

FIG. 9 is a diagram illustrating two example XR users (user 902 and user 906) in a first example environment 900 and two example XR users (user 912 and user 916) in a second example environment 910, according to various aspects of the present disclosure. User 902 uses XR device 904, user 906 uses XR device 908, user 912 uses XR device 914, and user 916 uses XR device 918. User 902 and user 906 are physically present in environment 900 and user 912 and user 916 are physically present in environment 910.

Similar to FIG. 8, FIG. 9 includes two example users (e.g., user 902 and user 906) physically present in environment 900 as an example. Systems and techniques described herein may apply to any number (including one) of XR devices and/or XR device users physically present in the first environment. Similarly, FIG. 9 includes two example users (e.g., user 912 and user 916) physically present in environment 910 as an example. Systems and techniques described herein may apply to any number (including one) of XR devices and/or XR device users physically present in the second environment. The systems and techniques may apply to any number of other XR devices and other XR device users.

User 902 and user 906 may virtually interact with user 912 and user 916 in a virtual representation of environment 910. XR device 914, XR device 918, XR device 904, and/or XR device 908 may determine a region 920, location 922, orientation 926, orientation 928, and/or location 924 for XR device 904 and/or XR device 908. For example, as described with regard to FIG. 8, XR device 914 and XR device 918 may determine region 920 based on a location of XR device 914 and/or a location of XR device 918. Additionally or alternatively, XR device 914, XR device 918, XR device 904, and/or XR device 908 may determine location 922 and/or location 924 within region 920. Additionally or alternatively, XR device 914, XR device 918, XR device 904, and/or XR device 908 may determine orientation 926 and/or orientation 928.

For example, a first group of XR users (e.g., user 902 and user 906) at environment 900 may wish to interact with a real-world view of another second group of AR users (e.g., user 912 and user 916) at environment 910. A reference location (e.g., location 922) in region 920 may be identified for the first group (e.g., user 902 and user 906) as a whole. The centroid of the first group's users'locations may be placed at this reference location.

Relative location/angle of arrival measurements may be performed for each group separately. As the users move around in the common view (which would be animated/virtual to the first group and real to the second group). The number of users included in each group may be based, at least in part, on capability data associated with the various users. As such, the various users may exchange capability data.

Figure 10:
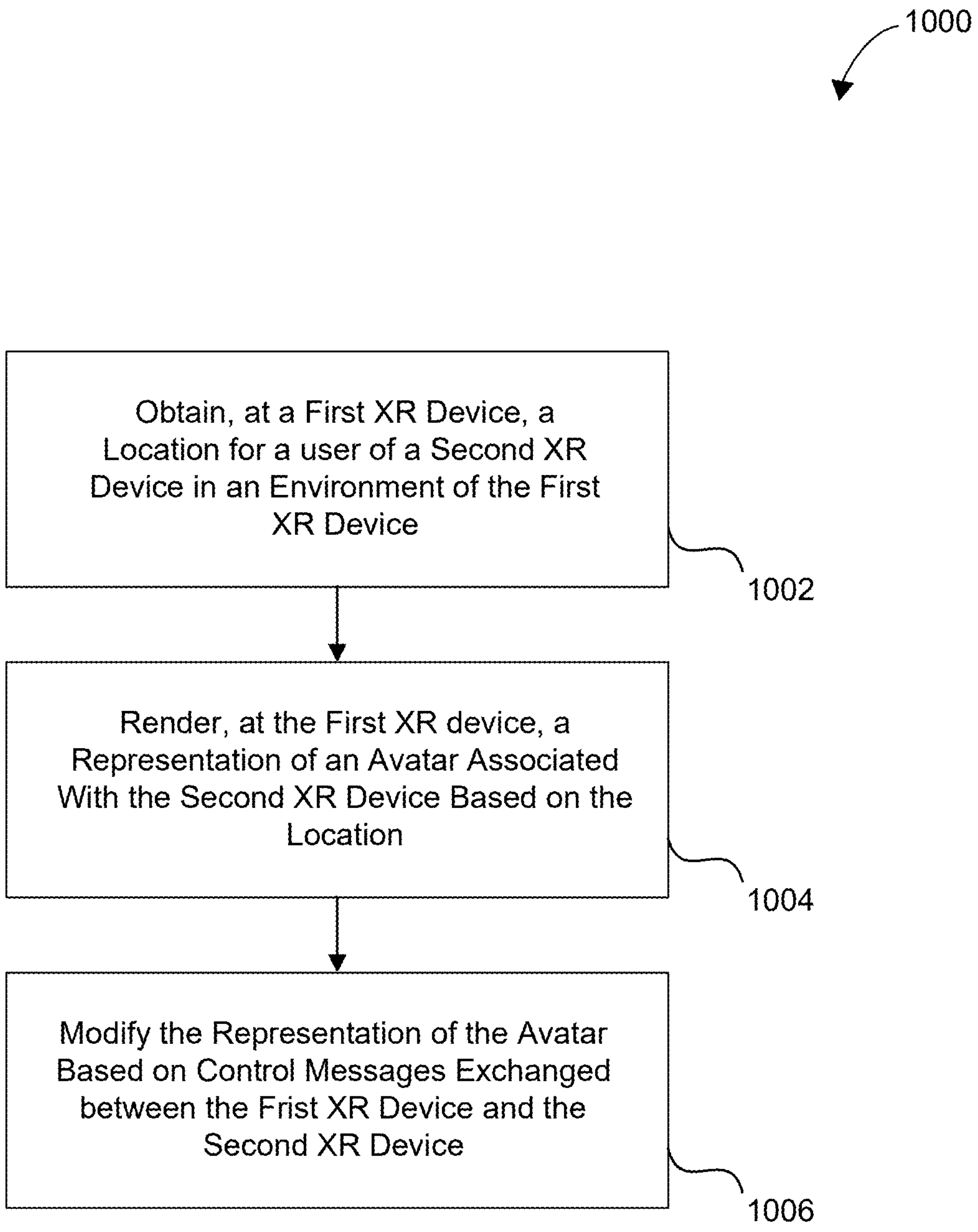
FIG. 10 is a flow diagram illustrating an example process for XR, in accordance with aspects of the present disclosure.

FIG. 10 is a flow diagram illustrating an example process 1000 for extended reality, in accordance with aspects of the present disclosure. One or more operations of process 1000 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 1000. The one or more operations of process 1000 may be implemented as software components that are executed and run on one or more processors.

At block 1002, a computing device (or one or more components thereof) may obtain a location for a user of a second XR device in an environment of the first XR device. For example, XR device 504 may obtain (e.g., determine or receive an indication of) location 510 in environment 500. Location 510 may be for user 702 of XR device 704.

In some aspects, the first XR device may be, or may include, an augmented reality (AR) device configured to display virtual content to a user of the first XR device while allowing the user of the first XR device to view the environment. For example, XR device 504 may be, or may include, an AR device allowing user 502 to see at least a portion of environment 500.

In some aspects, the second XR device may be, or may include, a virtual reality (VR) device configured to display virtual content to the user of the second XR device. For example, XR device 704 may be, or may include, a VR device.

In some aspects, the computing device (or one or more components thereof) may determine the location for the user of the second XR device; and cause at least one transmitter to transmit an indication of the location from the first XR device to the second XR device. For example, XR device 504 may determine location 510 and send an indication of location 510 to XR device 704.

In some aspects, determine a region of the environment of the first XR device for exploration by the user of the second XR device; cause at least one transmitter to transmit an indication of the region to the second XR device; and receive an indication of the location for the user of the second XR device from the second XR device. For example, XR device 504 may determine region 506 and transmit an indication of region 506 to XR device 704. XR device 704 may determine location 510 in region 506 and transmit an indication of location 510 to XR device 504.

In some aspects, the location for the user of the second XR device is determined relative to a location of the first XR device. For example, location 510 may be determined (either by XR device 504 or by XR device 704 relative to XR device 504.

the location for the user of the second XR device is determined based on a location of another device. For example, XR device 504 may determine location 510 based on an object at location 510 in environment 500.

At block 1004, the computing device (or one or more components thereof) may render a representation of an avatar associated with the second XR device based on the location. For example, XR device 504 may render avatar 602 associated with user 702 and/or XR device 704 at location 510.

At block 1006, the computing device (or one or more components thereof) may modify the representation of the avatar based on messages exchanged between the first XR device and the second XR device. For example, XR device 504 may modify avatar 602 based on messages exchanged between XR device 504 and XR device 704. For example, XR device 704 may send (e.g. through a network) a control signal indicating a motion or action for avatar 602. XR device 504 may modify a position of avatar 602 and/or render avatar 602 as performing the action.

In some aspects, the computing device (or one or more components thereof) may determine an orientation for the representation of the avatar associated with the second XR device, wherein the representation of the avatar associated with the second XR device is rendered based on the orientation. For example, XR device 504 may determine orientation 518. XR device 504 may render the avatar based on orientation 518 (e.g., facing in the direction of orientation 518).

In some aspects, the computing device (or one or more components thereof) may obtain, at the first XR device, sensor data associated with the environment of the first XR device; and cause at least one transmitter to transmit environmental data based on the sensor data to the second XR device. For example XR device 504 may include a scene-facing camera and may capture image and/or video of environment 500 and transmit the images and/or video to XR device 704.

In some aspects, the computing device (or one or more components thereof) may obtain capability data associated with the second XR device; wherein the environmental data is based on the capability data. For example, XR device 504 may obtain capability data from XR device 704. XR device 504 may transmit environmental data to XR device 704 based, at least in part, on the capability data.

In some aspects, the capability data may be indicative of a capability of the second XR device to at least one of receive or render virtual content. For example, XR device 704 may send to XR device 504 capability data indicative of a capability of XR device 704 to receive data (e.g., bandwidth data) and/or data indicative of a rendering capability of XR device 704.

In some aspects, the computing device (or one or more components thereof) may cause at least one transmitter to transmit avatar data of an avatar associated with the first XR device to the second XR device. For example, XR device 504 may send data indicative of avatar 706 to XR device 704.

In some aspects, the computing device (or one or more components thereof) may obtain capability data from the second XR device; wherein the avatar data is based on the capability data. For example, XR device 504 may obtain capability data from XR device 704. XR device 504 may transmit the avatar data to XR device 704 based, at least in part, on the capability data.

In some aspects, the capability data may be indicative of a capability of the second XR device to at least one of receive or render virtual content. For example, XR device 704 may send to XR device 504 capability data indicative of a capability of XR device 704 to receive data (e.g., bandwidth data) and/or data indicative of a rendering capability of XR device 704.

Figure 11:
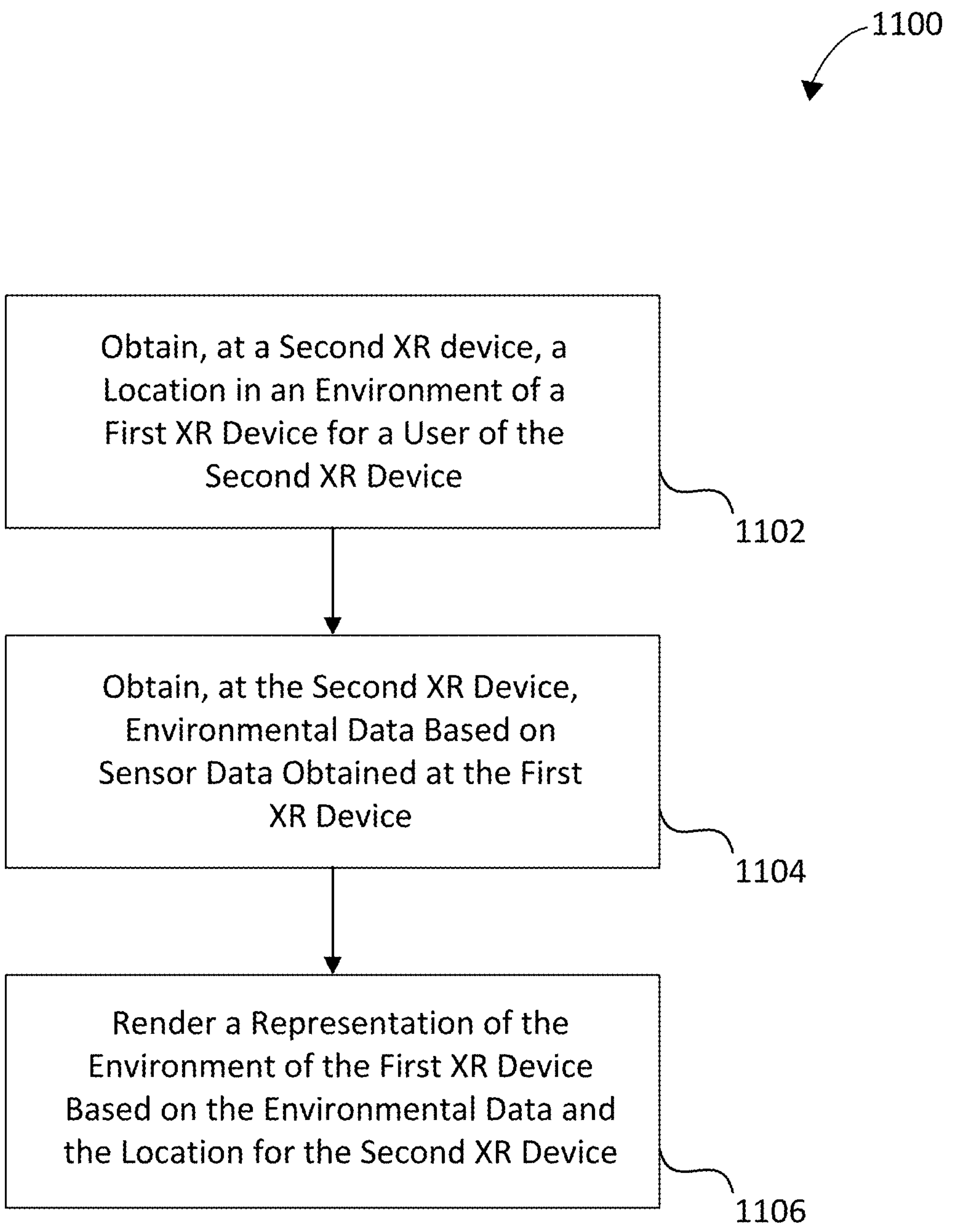
FIG. 11 is a flow diagram illustrating an example process for XR, in accordance with aspects of the present disclosure.

FIG. 11 is a flow diagram illustrating an example process 1100 for extended reality, in accordance with aspects of the present disclosure. One or more operations of process 1100 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 1100. The one or more operations of process 1100 may be implemented as software components that are executed and run on one or more processors.

At block 1102, a computing device (or one or more components thereof) may obtain a location in an environment of a first XR device for a user of the second XR device. For example, XR device 704 may obtain (e.g., determine or receive an indication of) location 510 in environment 500 of XR device 504.

In some aspects, the first XR device may be, or may include, an augmented reality (AR) device configured to display virtual content to a user of the first XR device while allowing the user of the first XR device to view the environment. For example, XR device 504 may be, or may include, an AR device allowing user 502 to see at least a portion of environment 500.

In some aspects, the second XR device may be, or may include, a virtual reality (VR) device configured to display virtual content to the user of the second XR device. For example, XR device 704 may be, or may include, a VR device.

In some aspects, the computing device (or one or more components thereof) may receive an indication of the location from the first XR device. For example, XR device 504 may determine location 510 and send an indication of location 510 to XR device 704.

In some aspects, the computing device (or one or more components thereof) may obtain an indication of a region of the environment for the user of the second XR device; determine the location for the user of the second XR device based on the region; and cause at least one transmitter to transmit an indication of the location to the first XR device. For example, XR device 504 may determine region 506 and send an indication of region 506 to XR device 704. XR device 704 may determine location 510 in region 506 and send an indication of location 510 to XR device 504.

In some aspects, the location for the user of the second XR device may be determined relative to a location of the first XR device. For example, location 510 may be determined (either by XR device 504 or by XR device 704) relative to XR device 504.

In some aspects, the location for the user of the second XR device may be determined based on a location of another device. For example, XR device 504 may determine location 510 based on a device at location 510 in environment 500.

At block 1104, the computing device (or one or more components thereof) may obtain environmental data based on sensor data obtained at the first XR device. For example, XR device 704 may receive environmental data from XR device 504.

At block 1106, the computing device (or one or more components thereof) may render a representation of the environment of the first XR device based on the environmental data and the location for the user of the second XR device. For example, XR device 704 may render a representation of environment 500.

In some aspects, the computing device (or one or more components thereof) may determine an orientation for the second XR device in the environment, wherein the representation of the environment is rendered based on the orientation. For example XR device 704 may determine orientation 518. XR device 704 may render the representation of environment 500 based, at least in part, on orientation 518 For example, XR device 704 may determine a portion of environment 500 visible to XR device 704 based on orientation 518.

In some aspects, the computing device (or one or more components thereof) may cause at least one transmitter to transmit capability data associated with the second XR device to the first XR device; wherein the environmental data is based on the capability data. For example, XR device 704 may transmit capability data to XR device 504 and XR device 504 may determine environmental data to send to XR device 704 based, at least in part, on the capability data.

In some aspects, the capability data may be indicative of a capability of the second XR device to at least one of receive or render virtual content. For example, the capability data sent from XR device 704 to XR device 504 may be, or may include, an indication of a capability of XR device 704 to receive data (e.g., bandwidth) and/or an indication of a rendering capability of XR device 704.

In some aspects, the computing device (or one or more components thereof) may obtain capability data from the first XR device; wherein the avatar data is based on the capability data. For example, the capability data sent from XR device 704 to XR device 504 may be, or may include, an indication of a capability of XR device 704 to receive data (e.g., bandwidth) and/or an indication of a rendering capability of XR device 704. XR device 504 may determine avatar data to send to XR device 704 based, at least in part, on the capability data.

In some aspects, the computing device (or one or more components thereof) may obtain avatar data of an avatar associated with the first XR device; and render a representation of the avatar associated with the first XR device based on the location. For example, XR device 704 may receive an indication of avatar 706 from XR device 504 and render avatar 706.

In some examples, as noted previously, the methods described herein (e.g., process 1000 of FIG. 10, process 1100 of FIG. 11, and/or other methods described herein) can be performed, in whole or in part, by a computing device or apparatus. In one example, one or more of the methods can be performed by XR device 102 of FIG. 1, display device 202 and processing device 204 of FIG. 2, XR device 302 of FIG. 3, XR system 400 of FIG. 4, XR device 504 of FIG. 5, FIG. 6, FIG. 8, XR device 704 of FIG. 7, XR device 804 of FIG. 8, XR device 904 of FIG. 9, XR device 908 of FIG. 9, XR device 914 of FIG. 9, XR device 918 of FIG. 9, or by another system or device. In another example, one or more of the methods (e.g., process 1000, process 1100, and/or other methods described herein) can be performed, in whole or in part, by the computing-device architecture 1200 shown in FIG. 12. For instance, a computing device with the computing-device architecture 1200 shown in FIG. 12 can include, or be included in, the components of the XR device 102, display device 202, processing device 204, XR device 302, XR system 400, XR device 504, XR device 704, XR device 804, XR device 904, XR device 908, XR device 914, and/or XR device 918 and can implement the operations of process 1100, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1000, process 1100, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1000, process 1100, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 12:
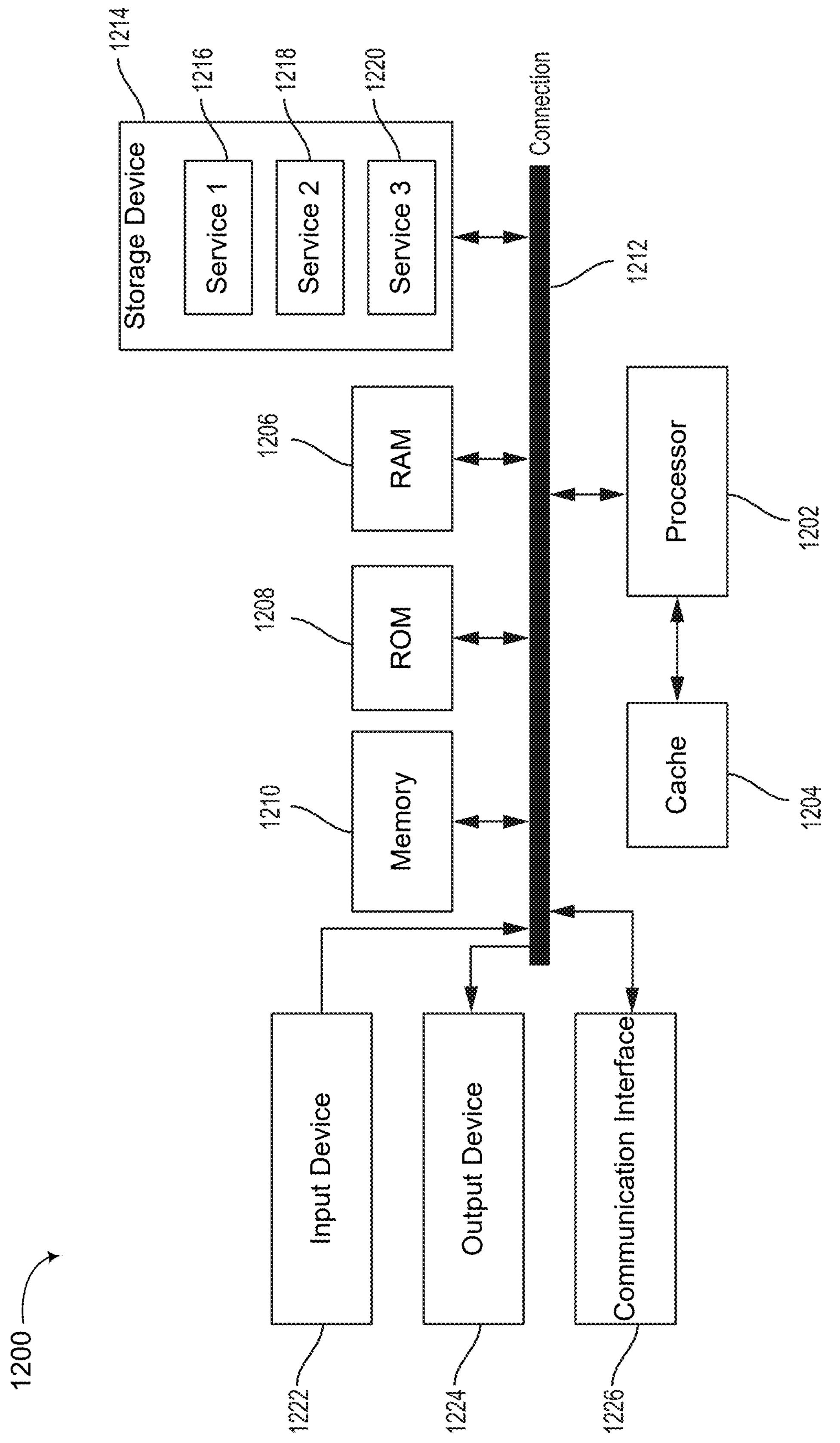
FIG. 12 is a block diagram illustrating an example computing-device architecture of an example computing device which can implement the various techniques described herein.

FIG. 12 illustrates an example computing-device architecture 1200 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1200 may include, implement, or be included in any or all of XR device 102 of FIG. 1, display device 202 and processing device 204 of FIG. 2, XR device 302 of FIG. 3, XR system 400 of FIG. 4, XR device 504 of FIG. 5, FIG. 6, FIG. 8, XR device 704 of FIG. 7, XR device 804 of FIG. 8, XR device 904 of FIG. 9, XR device 908 of FIG. 9, XR device 914 of FIG. 9, XR device 918 of FIG. 9, and/or other devices, modules, or systems described herein. Additionally or alternatively, computing-device architecture 1200 may be configured to perform process 1000, process 1100, and/or other process described herein.

The components of computing-device architecture 1200 are shown in electrical communication with each other using connection 1212, such as a bus. The example computing-device architecture 1200 includes a processing unit (CPU or processor) 1202 and computing device connection 1212 that couples various computing device components including computing device memory 1210, such as read only memory (ROM) 1208 and random-access memory (RAM) 1206, to processor 1202.

Computing-device architecture 1200 can include a cache of high-speed memory connected directly with, in close proximity to, or integrated as part of processor 1202. Computing-device architecture 1200 can copy data from memory 1210 and/or the storage device 1214 to cache 1204 for quick access by processor 1202. In this way, the cache can provide a performance boost that avoids processor 1202 delays while waiting for data. These and other modules can control or be configured to control processor 1202 to perform various actions. Other computing device memory 1210 may be available for use as well. Memory 1210 can include multiple different types of memory with different performance characteristics. Processor 1202 can include any general-purpose processor and a hardware or software service, such as service 1 1216, service 2 1218, and service 3 1220 stored in storage device 1214, configured to control processor 1202 as well as a special-purpose processor where software instructions are incorporated into the processor design. Processor 1202 may be a self-contained system, containing multiple cores or processors, a bus, memory controller, cache, etc. A multi-core processor may be symmetric or asymmetric.

To enable user interaction with the computing-device architecture 1200, input device 1222 can represent any number of input mechanisms, such as a microphone for speech, a touch-sensitive screen for gesture or graphical input, keyboard, mouse, motion input, speech and so forth. Output device 1224 can also be one or more of a number of output mechanisms known to those of skill in the art, such as a display, projector, television, speaker device, etc. In some instances, multimodal computing devices can enable a user to provide multiple types of input to communicate with computing-device architecture 1200. Communication interface 1226 can generally govern and manage the user input and computing device output. There is no restriction on operating on any particular hardware arrangement and therefore the basic features here may easily be substituted for improved hardware or firmware arrangements as they are developed.

Storage device 1214 is a non-volatile memory and can be a hard disk or other types of computer readable media which can store data that are accessible by a computer, such as magnetic cassettes, flash memory cards, solid state memory devices, digital versatile discs (DVDs), cartridges, random-access memories (RAMs) 1206, read only memory (ROM) 1208, and hybrids thereof. Storage device 1214 can include services 1216, 1218, and 1220 for controlling processor 1202. Other hardware or software modules are contemplated. Storage device 1214 can be connected to the computing device connection 1212. In one aspect, a hardware module that performs a particular function can include the software component stored in a computer-readable medium in connection with the necessary hardware components, such as processor 1202, connection 1212, output device 1224, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A first extended reality (XR) device, the first XR device comprising: at least one memory; and at least one processor coupled to the at least one memory and configured to: obtain a location for a user of a second XR device in an environment of the first XR device; render a representation of an avatar associated with the second XR device based on the location; and modify the representation of the avatar based on messages exchanged between the first XR device and the second XR device.

Aspect 2. The first XR device of aspect 1, wherein the first XR device comprises an augmented reality (AR) device configured to display virtual content to a user of the first XR device while allowing the user of the first XR device to view the environment.

Aspect 3. The first XR device of any one of aspects 1 or 2, wherein the second XR device comprises a virtual reality (VR) device configured to display virtual content to the user of the second XR device.

Aspect 4. The first XR device of any one of aspects 1 to 3, wherein the at least one processor is configured to: determine the location for the user of the second XR device; and cause at least one transmitter to transmit an indication of the location from the first XR device to the second XR device.

Aspect 5. The first XR device of any one of aspects 1 to 4, wherein the at least one processor is configured to: determine a region of the environment of the first XR device for exploration by the user of the second XR device; cause at least one transmitter to transmit an indication of the region to the second XR device; and receive an indication of the location for the user of the second XR device from the second XR device.

Aspect 6. The first XR device of any one of aspects 1 to 5, wherein the location for the user of the second XR device is determined relative to a location of the first XR device.

Aspect 7. The first XR device of any one of aspects 1 to 6, wherein the location for the user of the second XR device is determined based on a location of another device.

Aspect 8. The first XR device of any one of aspects 1 to 7, wherein the at least one processor is configured to determine an orientation for the representation of the avatar associated with the second XR device, wherein the representation of the avatar associated with the second XR device is rendered based on the orientation.

Aspect 9. The first XR device of any one of aspects 1 to 8, wherein the at least one processor is configured to: obtain, at the first XR device, sensor data associated with the environment of the first XR device; and cause at least one transmitter to transmit environmental data based on the sensor data to the second XR device.

Aspect 10. The first XR device of aspect 9, wherein the at least one processor is configured to obtain capability data associated with the second XR device; wherein the environmental data is based on the capability data.

Aspect 11. The first XR device of aspect 10, wherein the capability data is indicative of a capability of the second XR device to at least one of receive or render virtual content.

Aspect 12. The first XR device of any one of aspects 1 to 11, wherein the at least one processor is configured to cause at least one transmitter to transmit avatar data of an avatar associated with the first XR device to the second XR device.

Aspect 13. The first XR device of aspect 12, wherein the at least one processor is configured to obtain capability data from the second XR device; wherein the avatar data is based on the capability data.

Aspect 14. The first XR device of aspect 13, wherein the capability data is indicative of a capability of the second XR device to at least one of receive or render virtual content.

Aspect 15. A second extended reality (XR) device, the second XR device comprising: at least one memory; and at least one processor coupled to the at least one memory and configured to: obtain a location in an environment of a first XR device for a user of the second XR device; obtain environmental data based on sensor data obtained at the first XR device; and render a representation of the environment of the first XR device based on the environmental data and the location for the user of the second XR device.

Aspect 16. The second XR device of aspect 15, wherein the first XR device comprises an augmented reality (AR) device configured to display virtual content to a user of the first XR device while allowing the user of the first XR device to view the environment.

Aspect 17. The second XR device of any one of aspects 15 or 16, wherein the second XR device comprises a virtual reality (VR) device configured to display virtual content to the user of the second XR device.

Aspect 18. The second XR device of any one of aspects 15 to 17, wherein the at least one processor is configured to receive an indication of the location from the first XR device.

Aspect 19. The second XR device of any one of aspects 15 to 18, wherein the at least one processor is configured to: obtain an indication of a region of the environment for the user of the second XR device; determine the location for the user of the second XR device based on the region; and cause at least one transmitter to transmit an indication of the location to the first XR device.

Aspect 20. The second XR device of any one of aspects 15 to 19, wherein the location for the user of the second XR device is determined relative to a location of the first XR device.

Aspect 21. The second XR device of any one of aspects 15 to 20, wherein the location for the user of the second XR device is determined based on a location of another device.

Aspect 22. The second XR device of any one of aspects 15 to 21, wherein the at least one processor is configured to determine an orientation for the second XR device in the environment, wherein the representation of the environment is rendered based on the orientation.

Aspect 23. The second XR device of any one of aspects 15 to 22, wherein the at least one processor is configured to cause at least one transmitter to transmit capability data associated with the second XR device to the first XR device; wherein the environmental data is based on the capability data.

Aspect 24. The second XR device of aspect 23, wherein the capability data is indicative of a capability of the second XR device to at least one of receive or render virtual content.

Aspect 25. The second XR device of any one of aspects 15 to 24, wherein the at least one processor is configured to: obtain avatar data of an avatar associated with the first XR device; and render a representation of the avatar associated with the first XR device based on the location.

Aspect 26. The second XR device of aspect 25, wherein the at least one processor is configured to cause at least one transmitter to transmit capability data associated with the second XR device to the first XR device; wherein the avatar data is based on the capability data.

Aspect 27. The second XR device of aspect 26, wherein the capability data is indicative of a capability of the second XR device to at least one of receive or render virtual content.

Aspect 28. The second XR device of any one of aspects 15 to 27, wherein the at least one processor is configured to cause at least one transmitter to transmit avatar data of an avatar associated with the second XR device to the first XR device.

Aspect 29. The second XR device of aspect 28, wherein the at least one processor is configured to obtain capability data from the first XR device; wherein the avatar data is based on the capability data.

Aspect 30. A method for extended reality (XR), the method comprising: obtaining, at a first XR device, a location for a user of a second XR device in an environment of the first XR device; rendering, at the first XR device, a representation of an avatar associated with the second XR device based on the location; and modifying the representation of the avatar based on messages exchanged between the first XR device and the second XR device.

Aspect 31. The method of aspect 30, wherein the first XR device comprises an augmented reality (AR) device configured to display virtual content to a user of the first XR device while allowing the user of the first XR device to view the environment.

Aspect 32. The method of any one of aspects 30 or 31, wherein the second XR device comprises a virtual reality (VR) device configured to display virtual content to the user of the second XR device.

Aspect 33. The method of any one of aspects 30 to 32, further comprising: determining, at the first XR device, the location for the user of the second XR device; and transmitting an indication of the location from the first XR device to the second XR device.

Aspect 34. The method of any one of aspects 30 to 33, further comprising: determining, at the first XR device, a region of the environment of the first XR device for exploration by the user of the second XR device; transmitting an indication of the region to the second XR device; and receiving an indication of the location for the user of the second XR device from the second XR device.

Aspect 35. The method of any one of aspects 30 to 34, wherein the location for the user of the second XR device is determined relative to a location of the first XR device.

Aspect 36. The method of any one of aspects 30 to 35, wherein the location for the user of the second XR device is determined based on a location of another device.

Aspect 37. The method of any one of aspects 30 to 36, further comprising determining an orientation for the representation of the avatar associated with the second XR device, wherein the representation of the avatar associated with the second XR device is rendered based on the orientation.

Aspect 38. The method of any one of aspects 30 to 37, further comprising: obtaining, at the first XR device, sensor data associated with the environment of the first XR device; and transmitting environmental data based on the sensor data to the second XR device.

Aspect 39. The method of aspect 38, further comprising obtaining, at the first XR device, capability data associated with the second XR device; wherein the environmental data is based on the capability data.

Aspect 40. The method of aspect 39, wherein the capability data is indicative of a capability of the second XR device to at least one of receive or render virtual content.

Aspect 41. The method of aspect 30, further comprising transmitting avatar data of an avatar associated with the first XR device to the second XR device.

Aspect 42. The method of aspect 41, further comprising obtaining capability data from the second XR device; wherein the avatar data is based on the capability data.

Aspect 43. The method of aspect 42, wherein the capability data is indicative of a capability of the second XR device to at least one of receive or render virtual content.

Aspect 44. A method for extended reality (XR), the method comprising: obtaining, at a second XR device, a location in an environment of a first XR device for a user of the second XR device; obtaining, at the second XR device, environmental data based on sensor data obtained at the first XR device; and rendering a representation of the environment of the first XR device based on the environmental data and the location for the user of the second XR device.

Aspect 45. The method of aspect 44, wherein the first XR device comprises an augmented reality (AR) device configured to display virtual content to a user of the first XR device while allowing the user of the first XR device to view the environment.

Aspect 46. The method of any one of aspects 44 or 45, wherein the second XR device comprises a virtual reality (VR) device configured to display virtual content to the user of the second XR device.

Aspect 47. The method of any one of aspects 44 to 46, further comprising receiving an indication of the location from the first XR device.

Aspect 48. The method of any one of aspects 44 to 47, further comprising: obtaining, at the second XR device, an indication of a region of the environment for the user of the second XR device; determining the location for the user of the second XR device based on the region; and transmitting an indication of the location to the first XR device.

Aspect 49. The method of any one of aspects 44 to 48, wherein the location for the user of the second XR device is determined relative to a location of the first XR device.

Aspect 50. The method of any one of aspects 44 to 49, wherein the location for the user of the second XR device is determined based on a location of another device.

Aspect 51. The method of any one of aspects 44 to 50, further comprising determining an orientation for the second XR device in the environment, wherein the representation of the environment is rendered based on the orientation.

Aspect 52. The method of any one of aspects 44 to 51, further comprising transmitting capability data associated with the second XR device to the first XR device; wherein the environmental data is based on the capability data.

Aspect 53. The method of aspect 52, wherein the capability data is indicative of a capability of the second XR device to at least one of receive or render virtual content.

Aspect 54. The method of any one of aspects 44 to 53, further comprising: obtaining avatar data of an avatar associated with the first XR device; and rendering a representation of the avatar associated with the first XR device based on the location.

Aspect 55. The method of aspect 54, further comprising transmitting capability data associated with the second XR device to the first XR device; wherein the avatar data is based on the capability data.

Aspect 56. The method of aspect 55, wherein the capability data is indicative of a capability of the second XR device to at least one of receive or render virtual content.

Aspect 57. The method of any one of aspects 44 to 56, further comprising transmitting avatar data of an avatar associated with the second XR device to the first XR device.

Aspect 58. The method of aspect 57, further comprising obtaining capability data from the first XR device; wherein the avatar data is based on the capability data.

Aspect 59. A non-transitory computer-readable storage medium having stored thereon instructions that, when executed by at least one processor, cause the at least one processor to perform operations according to any of aspects 30 to 58.

Aspect 60. An apparatus for providing virtual content for display, the apparatus comprising one or more means for perform operations according to any of aspects 30 to 58.

What is claimed is:

1. A first extended reality (XR) device, the first XR device comprising:
- at least one memory; and
- at least one processor coupled to the at least one memory and configured to:
  - generate a three-dimensional (3D) representation of an environment of the first XR device based on sensor data representative of the environment captured by the first XR device;
  - transmit the 3D representation of the environment to a second XR device;
  - obtain a first location for the second XR device in the environment;
  - render a representation of an avatar associated with the second XR device based on the first location;
  - receive a control message from the second XR device, the control message indicating a movement from the first location to a second location within the environment; and
  - render the representation of the avatar based on the second location.

2. The first XR device of claim 1, wherein the first XR device comprises an augmented reality (AR) device configured to display virtual content to a user of the first XR device while allowing the user of the first XR device to view the environment.

3. The first XR device of claim 1, wherein the second XR device comprises a virtual reality (VR) device configured to display virtual content to a user of the second XR device.

4. The first XR device of claim 1, wherein, to obtain the first location for the second XR device in the environment, the at least one processor is configured to:
- determine the first location for the second XR device in the environment; and
- cause at least one transmitter to transmit an indication of the first location for the second XR device from the first XR device to the second XR device.

5. The first XR device of claim 1, wherein, to obtain the first location for the second XR device in the environment, the at least one processor is configured to:
- determine a region of the environment of the first XR device for exploration by a user of the second XR device;
- cause at least one transmitter to transmit an indication of the region to the second XR device; and
- receive an indication of the first location for the second XR device from the second XR device.

6. The first XR device of claim 1, wherein the first location for the second XR device is determined relative to a location of the first XR device.

7. The first XR device of claim 1, wherein the first location for the second XR device is determined based on a location of another device.

8. The first XR device of claim 1, wherein the at least one processor is configured to:

determine an orientation for the representation of the avatar associated with the second XR device; and render the representation of the avatar associated with the second XR device based on the orientation.

9. The first XR device of claim 1, wherein the at least one processor is configured to capture the sensor data representative of the environment of the first XR device.

10. The first XR device of claim 1, wherein the at least one processor is configured to;

obtain capability data associated with the second XR device; and generate the 3D representation of the environment based on the capability data.

11. The first XR device of claim 10, wherein the capability data is indicative of a capability of the second XR device to at least one of receive or render virtual content.

12. The first XR device of claim 1, wherein the at least one processor is configured to cause at least one transmitter to transmit avatar data of an avatar associated with the first XR device to the second XR device.

13. The first XR device of claim 12, wherein the at least one processor is configured to obtain capability data from the second XR device; wherein the avatar data is based on the capability data.

14. The first XR device of claim 13, wherein the capability data is indicative of a capability of the second XR device to at least one of receive or render virtual content.

15. A first extended reality (XR) device, the first XR device comprising:

at least one memory; and at least one processor coupled to the at least one memory and configured to:

receive a three-dimensional (3D) representation of an environment of a second XR device based on sensor data representative of the environment captured by the second XR device;

obtain a first location in the environment for the first XR device;

render a first representation of the environment of the second XR device based on the 3D representation of the environment and the first location for the first XR device;

receive a control indicating a movement from the first location to a second location within the environment; and render a second representation of the environment of the second XR device based on the 3D representation of the environment and the second location.

16. The first XR device of claim 15, wherein the second XR device comprises an augmented reality (AR) device configured to display virtual content to a user of the second XR device while allowing the user of the second XR device to view the environment.

17. The first XR device of claim 15, wherein the first XR device comprises a virtual reality (VR) device configured to display virtual content to a user of the first XR device.

18. The first XR device of claim 15, wherein, to obtain the first location for the first XR device in the environment, the at least one processor is configured to receive an indication of the first location from the second XR device.

19. The first XR device of claim 15, wherein, to obtain the first location for the first XR device in the environment, the at least one processor is configured to:

obtain, from the second XR device, an indication of a region of the environment for the first XR device;

determine the first location for the first XR device based on the region; and cause at least one transmitter to transmit an indication of the first location to the second XR device.

20. The first XR device of claim 15, wherein the first location for the first XR device is determined relative to a location of the second XR device.

21. The first XR device of claim 15, wherein the first location for the first XR device is determined based on a location of another device.

22. The first XR device of claim 15, wherein the at least one processor is configured to:

determine an orientation for the first XR device in the environment; and render the first representation of the environment based on the orientation.

23. The first XR device of claim 15, wherein the at least one processor is configured to cause at least one transmitter to transmit capability data associated with the first XR device to the second XR device; wherein the 3D representation of the environment is based on the capability data.

24. The first XR device of claim 23, wherein the capability data is indicative of a capability of the first XR device to at least one of receive or render virtual content.

25. The first XR device of claim 15, wherein the at least one processor is configured to:

obtain avatar data of an avatar associated with the second XR device; and render a representation of the avatar associated with the second XR device based on the first location.

26. The first XR device of claim 25, wherein the at least one processor is configured to cause at least one transmitter to transmit capability data associated with the first XR device to the second XR device; wherein the avatar data is based on the capability data.

27. The first XR device of claim 26, wherein the capability data is indicative of a capability of the first XR device to at least one of receive or render virtual content.

28. The first XR device of claim 15, wherein the at least one processor is configured to cause at least one transmitter to transmit avatar data of an avatar associated with the first XR device to the second XR device.

29. A method for extended reality (XR), the method comprising:

generating a three-dimensional (3D) representation of an environment of a first XR device based on sensor data representative of the environment captured by the first XR device;

transmitting the 3D representation of the environment to a second XR device;

obtaining a first location for a second XR device in the environment;

rendering a representation of an avatar associated with the second XR device based on the first location;

receiving a control message from the second XR device, the control message indicating a movement from the first location to a second location within the environment; and rendering the representation of the avatar based on the second location.

30. A method for extended reality (XR), the method comprising:

receiving a three-dimensional (3D) representation of an environment of a second XR device based on sensor data representative of the environment captured by the second XR device;

obtaining a first location in the environment for a first XR device;

rendering a first representation of the environment of the second XR device based on the 3D representation of the environment and the first location for the first XR device;

receiving a control indicating a movement from the first location to a second location within the environment; and rendering a second representation of the environment of the second XR device based on the 3D representation of the environment and the second location.

* * * * *